(12) United States Patent
Kennedy et al.

(10) Patent No.: US 8,170,372 B2
(45) Date of Patent: May 1, 2012

(54) SYSTEM AND METHOD TO FIND THE PRECISE LOCATION OF OBJECTS OF INTEREST IN DIGITAL IMAGES

(76) Inventors: Michael B. Kennedy, Baltimore, MD (US); Daniel Curtis, Easton, MD (US)

( * ) Notice: Subject to any disclaimer, the term of this patent is extended or adjusted under 35 U.S.C. 154(b) by 0 days.

(21) Appl. No.: 13/075,975

(22) Filed: Mar. 30, 2011

(65) Prior Publication Data
US 2012/0033852 A1 Feb. 9, 2012

Related U.S. Application Data

(60) Provisional application No. 61/371,460, filed on Aug. 6, 2010.

(51) Int. Cl.
*G06K 9/36* (2006.01)

(52) U.S. Cl. ...................................................... 382/291

(58) Field of Classification Search .......... 382/173–182, 382/184–189, 195–200, 291
See application file for complete search history.

(56) References Cited

U.S. PATENT DOCUMENTS

| | | | |
|---|---|---|---|
| 4,745,550 A | 5/1988 | Witkin et al. | |
| 5,159,667 A | 10/1992 | Borrey et al. | |
| 5,623,558 A | 4/1997 | Billawala et al. | |
| 5,627,915 A | 5/1997 | Rosser et al. | |
| 5,852,675 A | 12/1998 | Matsuo | |
| 5,852,676 A | 12/1998 | Lazar | |
| 6,321,232 B1 * | 11/2001 | Syeda-Mahmood | 1/1 |
| 6,525,744 B1 | 2/2003 | Poggio et al. | |
| 7,020,335 B1 | 3/2006 | Abousleman | |
| 7,142,728 B2 | 11/2006 | Wnek | |
| 7,149,347 B1 | 12/2006 | Wnek | |
| 7,174,044 B2 * | 2/2007 | Ding et al. | 382/210 |
| 2003/0233619 A1 | 12/2003 | Fast | |
| 2010/0199224 A1 * | 8/2010 | Doerring | 715/856 |

OTHER PUBLICATIONS

Forstner, Wolfgang, et al, On the Completeness of Coding with Image Features, © 2009, Department of Photogrammetry Inst. of Geodesy and Geoinformation, University of Bonn, Bonn, Germany. Last known URL: http://www.ipb.uni-bonn.de/uploads/tx_ikgpublication/foerster09.completeness.pdf.

(Continued)

*Primary Examiner* — Brian Le
(74) *Attorney, Agent, or Firm* — Berenato & White, LLC

(57) ABSTRACT

The present invention is a method and system to precisely locate objects of interest in any given image scene space, which finds the presence of objects based upon pattern matching geometric relationships to a master, known set. The method and system prepares images for feature and attribute detection and identifies the presence of potential objects of interest, then narrows down the objects based upon how well they match a pre designated master template. The method by which matching takes place is done through finding all objects, plotting its area, juxtaposing a sweet spot overlap of its area on master objects, which in turn forms a glyph shape. The glyph shape is recorded, along with all other formed glyphs in an image's scene space and then mapped to form sets using a classifier and finally a pattern matching algorithm. The resulting objects of interest matches are then refined to plot the contour boundaries of the object's grouped elements (arrangement of contiguous pixels of the given object called a Co-Glyph) and finally snapped to its component actual dimensions e.g., x, y of a character or individual living cell.

20 Claims, 32 Drawing Sheets

OTHER PUBLICATIONS

Landon, George, Innovative Techniques for Digitizing and Restoring Deteriorated Historical Documents, E. Kentucky University, PhD 2008, E. Kentucky University, Richmond, KY © 2008; URL: http://cslinux.eku.edu/landong/papers/landon-dissertation.pdf.

Seales, Brent, Landon, George, et al, Geometric and Photometric Restoration of Distorted Documents, © 2006, IEEE in Computer Vision. Tenth IEEE International Conference on, pp. 1117-1123 vol. 2.

* cited by examiner

LEGEND:

1100 = a1
1101 = e1
1102 = c1
1103 = e2
1104 = a2
1105 = c2
1106 = Mh1
1107 = r1
1108 = Mh2
1109 = r2
1110 = PIXELS
1111 = CENTROID (ORIGIN)

101: $f(x) = mh_1 + mh_2$, OR

102: $mh_{1-2} = a_{1-2} + e_{1-2} + r_{1-2} = f(x)$ where, $e = e^{\ln(x)} = x$ $c \approx (3.2 - 3.49)$

FIG. 16 A.

● = INDICATES TYPES OF INVENTION CLASSES USED BY APP

| INVENTION CLASSES & CODES: / IDENTIFIED APPLICATIONS OF THE INVENTION: DOCUMENT IMAGING | DOCUMENT ID | FIELD, OOI ID & SELECTION | PATTERN TRAINING DATA GENERATION | PATTERN ID & RECOGNITION | REDACTION ZONE ID | METADATA ID & SELECTION | DOCUMENT STRUCTURE ID & RECORDING | DOCUMENT CLASSIFICATION GENERATION | DOCUMENT AUTHENTICATION | REPOSITORY & VERSION CONTROL SCENE & OOI-BASED ENCODING | ARCHIVAL PRESERVATION |
|---|---|---|---|---|---|---|---|---|---|---|---|
| RAPID IMAGE SCENE OBJECT (-N) DIMENSIONAL MAPPING & RECORDING (SOMR) | ● | ● | ● | ● | ● | ● | ● | ● | ● | ● | ● |
| RAPID OOI ID (OOID) | ● | ● |  |  | ● | ● | ● | ● | ● | ● | ● |
| PATTERN TRAINING DATA GENERATION (PTDG) | ● |  | ● | ● | ● | ● | ● | ● | ● | ● |  |
| RAPID OBJECT-CLASS ID (OCID) | ● | ● |  |  | ● | ● | ● |  | ● |  |  |
| OOI PATTERN ID (OPID) | ● | ● |  |  | ● | ● | ● | ● |  | ● |  |
| OOI PATTERN RE-COGNITION (OPRC) | ● |  |  |  | ● | ● | ● | ● |  |  |  |
| OOI DIFFERENTIAL DATA ANALYSIS (ODDA) | ● |  |  |  | ● | ● | ● |  |  |  |  |
| OOI MOTION VECTOR RECORDING (OMVR) |  |  | ● |  | ● | ● | ● |  |  |  |  |
| TEMPORAL RESOLUTION CALIBRATION OF COLLECTION ARRAYS (TRCA) |  | ● | ● |  |  | ● | ● | ● |  |  | ● |
| APP-DRIVEN OOI SELECTION (ADOS) | ● | ● | ● |  | ● |  |  |  | ● | ● |  |
| INTER-IMAGE SCENE MOTION VECTOR TRACKING & ANALYSIS (IMVT) |  | ● | ● |  | ● | ● | ● | ● |  |  |  |
| OOI SCENE POSITION PREDICTION (OSPP) |  | ● | ● |  | ● | ● | ● | ● |  | ● |  |
| OOI & SCENE-BASED COMPRESSION (OSBC) | ● | ● |  |  | ● | ● |  |  |  | ● | ● |
| OOI-AIDED MACHINE VISION INSPECTION (OMVI) |  | ● |  |  |  |  |  |  | ● |  |  |
| OOI ID & ANALYSIS PRIVACY ACT/SECURITY FRIENDLY (PFOA) |  | ● |  |  | ● | ● |  |  | ● |  | ● |
| OOI VISUAL SEARCH INTERFACE (NON-SEMANTIC) (OVSI) | ● | ● |  | ● | ● | ● | ● | ● | ● | ● | ● |

FIG. 16B.

| INVENTION CLASSES & CODES: | RADIOGRAPHY | MAGNETIC | ULTRASOUND | MICROSCOPY | CHEMICAL | NUCLEAR & PHOTO-ACOUSTIC | PHYSICAL THERAPY MOTION FEEDBACK PATTERN ID & ANALYSIS | ATOMIC & SCANNING FORCE MICROSCOPY |
|---|---|---|---|---|---|---|---|---|
| RAPID IMAGE SCENE OBJECT (-N) DIMENSIONAL MAPPING & RECORDING (SOMR) | ● | ● | ● | ● | ● | ● |  | ● |
| OOI ID (OOID) | ● | ● | ● | ● | ● | ● |  | ● |
| PATTERN TRAINING DATA GENERATION (PTDG) | ● | ● | ● | ● | ● | ● |  | ● |
| RAPID OBJECT-CLASS ID (OCID) | ● | ● | ● | ● | ● | ● |  | ● |
| OOI PATTERN ID (OPID) | ● | ● | ● | ● | ● | ● |  | ● |
| OOI PATTERN RE-COGNITION (OPRC) | ● | ● | ● | ● | ● | ● | ● | ● |
| OOI DIFFERENTIAL DATA ANALYSIS (ODDA) | ● | ● | ● | ● | ● | ● | ● | ● |
| OOI MOTION VECTOR RECORDING (OMVR) | ● | ● | ● | ● | ● | ● | ● | ● |
| TEMPORAL RESOLUTION CALIBRATION OF COLLECTION ARRAYS (TRCA) | ● | ● | ● | ● | ● | ● | ● | ● |
| APP-DRIVEN OOI SELECTION (ADOS) | ● | ● | ● | ● | ● | ● | ● | ● |
| INTER-IMAGE SCENE MOTION VECTOR TRACKING & ANALYSIS (IMVT) | ● | ● | ● | ● | ● | ● | ● | ● |
| OOI SCENE POSITION PREDICTION (OSPP) | ● | ● | ● | ● | ● | ● | ● | ● |
| OOI & SCENE-BASED COMPRESSION (OSBC) |  |  |  |  |  |  |  |  |
| OOI-AIDED MACHINE VISION INSPECTION (OMVI) | ● | ● | ● | ● | ● | ● |  | ● |
| OOI ID & ANALYSIS (PFOA) PRIVACY ACT/SECURITY FRIENDLY | ● | ● | ● | ● | ● | ● | ● | ● |
| OOI VISUAL SEARCH INTERFACE (NON-SEMANTIC) (OVSI) | ● | ● | ● | ● | ● | ● |  | ● |

● = INDICATES TYPES OF INVENTION CLASSES USED BY APP

*IDENTIFIED APPLICATIONS OF THE INVENTION: MEDICAL IMAGING*

FIG. 17A.

*IDENTIFIED APPLICATIONS OF THE INVENTION:*
FORENSIC & LAW ENFORCEMENT IMAGING

| INVENTION CLASSES & CODES | CRIME SCENE IMAGING | REMAINS RECONSTRUCTION | DOCUMENT & PHOTO-GRAPHIC CASE PATTERN ID & CODING | EVIDENCE ID & CODING | ACCIDENT INVESTIGATION & RECONSTRUCTION | DEBRIS FIELD MAPPING & OBJECT RECOVERY | MASS VEHICLE & CRAFT ID & MAPPING FOR TRACKING | ARCHEOLOGICAL SITE MAPPING, OBJECT RECORDING & ID |
|---|---|---|---|---|---|---|---|---|
| RAPID IMAGE SCENE OBJECT (-N) DIMENSIONAL MAPPING & RECORDING (SOMR) | ● | ● | ● | ● | ● | ● | ● | ● |
| OOI ID (OOID) | ● | ● | ● | ● | ● | ● | ● | ● |
| PATTERN TRAINING DATA GENERATION (PTDG) | ● | ● | ● | ● | ● | ● | ● | ● |
| RAPID OBJECT-CLASS ID (OCID) | ● | ● | ● | ● | ● | ● | ● | ● |
| OOI PATTERN ID (OPID) | ● | ● | ● | ● | ● | ● | ● | ● |
| OOI PATTERN RE-COGNITION (OPRC) | ● | ● | ● | ● | ● | ● | ● | ● |
| OOI DIFFERENTIAL DATA ANALYSIS (ODDA) | ● | ● | ● | ● | ● | | | ● |
| OOI MOTION VECTOR RECORDING (OMVR) | ● | ● | | | ● | ● | ● | ● |
| TEMPORAL RESOLUTION CALIBRATION OF COLLECTION ARRAYS (TRCA) | ● | ● | | | ● | ● | ● | ● |
| APP-DRIVEN OOI SELECTION (ADOS) | | | | | | ● | ● | |
| INTER-IMAGE SCENE MOTION VECTOR TRACKING & ANALYSIS (IMVT) | ● | ● | ● | ● | ● | ● | ● | ● |
| OOI SCENE POSITION PREDICTION (OSPP) | | ● | | | ● | ● | ● | |
| OOI & SCENE-BASED COMPRESSION (OSBC) | | | ● | ● | | | ● | |
| OOI-AIDED MACHINE VISION INSPECTION (OMVI) | | | ● | ● | | ● | | |
| PRIVACY ACT/SECURITY FRIENDLY OOI ID & ANALYSIS (PFOA) | ● | | ● | ● | ● | ● | ● | |
| OOI VISUAL SEARCH INTERFACE (NON-SEMANTIC) (OVSI) | ● | ● | ● | ● | ● | ● | ● | ● |

● = INDICATES TYPES OF INVENTION CLASSES USED BY APP

FIG. 17 B.

● = INDICATES TYPES OF INVENTION CLASSES USED BY APP

| INVENTION CLASSES & CODES: / IDENTIFIED APPLICATIONS OF THE INVENTION: RECONNAISSANCE & REMOTE SENSED IMAGING | PHOTO-OPTICAL & ELECTRO-OPTICAL | MULTISPECTRAL | INFRARED | SYNTHETIC APERTURE RADAR (SAR) | TARGET ID | TARGET PREDICTION | TARGET SELECTION BASED ON PREDICTED QUALITY PROPERTIES | COASTAL & OPEN OCEAN DIRECTED SEARCH PATTERN GENERATION |
|---|---|---|---|---|---|---|---|---|
| RAPID IMAGE SCENE OBJECT (-N) DIMENSIONAL MAPPING & RECORDING (SOMR) | ● | ● | ● | ● | ● | ● | ● |  |
| OOI ID (OOID) | ● | ● | ● | ● | ● | ● | ● |  |
| PATTERN TRAINING DATA GENERATION (PTDG) | ● | ● | ● |  |  | ● | ● |  |
| RAPID OBJECT-CLASS ID (OCID) | ● | ● | ● |  |  |  | ● |  |
| OOI PATTERN ID (OPID) | ● | ● | ● | ● | ● | ● | ● |  |
| OOI PATTERN RE-COGNITION (OPRC) | ● | ● | ● | ● | ● | ● | ● |  |
| OOI DIFFERENTIAL DATA ANALYSIS (ODDA) | ● | ● | ● | ● |  | ● | ● |  |
| OOI MOTION VECTOR RECORDING (OMVR) | ● | ● | ● | ● | ● | ● |  |  |
| TEMPORAL RESOLUTION CALIBRATION OF COLLECTION ARRAYS (TRCA) | ● | ● | ● | ● | ● | ● | ● |  |
| APP-DRIVEN OOI SELECTION (ADOS) | ● | ● | ● | ● |  |  | ● | ● |
| INTER-IMAGE SCENE MOTION VECTOR TRACKING & ANALYSIS (IMVT) | ● | ● | ● | ● | ● | ● |  |  |
| OOI SCENE POSITION PREDICTION (OSPP) | ● | ● | ● | ● | ● | ● |  |  |
| OOI & SCENE-BASED COMPRESSION (OSBC) | ● | ● | ● | ● |  |  |  |  |
| OOI-AIDED MACHINE VISION INSPECTION (OMVI) | ● | ● | ● | ● | ● | ● |  | ● |
| OOI ID & ANALYSIS PRIVACY ACT/SECURITY FRIENDLY (PFOA) | ● | ● | ● | ● | ● | ● | ● | ● |
| OOI VISUAL SEARCH INTERFACE (NON-SEMANTIC) (OVSI) | ● | ● | ● | ● | ● | ● | ● | ● |

FIG. 17 C.

| INVENTION CLASSES & CODES: | LEGAL RESEARCH & LITIGATION SUPPORT IMAGING | |
|---|---|---|
| *IDENTIFIED APPLICATIONS OF THE INVENTION:* | INTRA & INTER DOCUMENT GERMANE PATTERN ID | DISCOVERY TRIAGE DOC. ID & SORTING |
| RAPID IMAGE SCENE OBJECT (-N) DIMENSIONAL MAPPING & RECORDING (SOMR) | ● | ● |
| OOI ID (OOID) | ● | ● |
| PATTERN TRAINING DATA GENERATION (PTDG) | ● | ● |
| RAPID OBJECT-CLASS ID (OCID) | ● | ● |
| OOI PATTERN ID (OPID) | ● | ● |
| OOI PATTERN RE-COGNITION (OPRC) | ● | ● |
| OOI DIFFERENTIAL DATA ANALYSIS (ODDA) | ● | ● |
| OOI MOTION VECTOR RECORDING (OMVR) | ● | |
| TEMPORAL RESOLUTION CALIBRATION OF COLLECTION ARRAYS (TRCA) | ● | |
| APP-DRIVEN OOI SELECTION (ADOS) | ● | ● |
| INTER-IMAGE SCENE MOTION VECTOR TRACKING & ANALYSIS (IMVT) | | |
| OOI SCENE POSITION PREDICTION (OSPP) | ● | |
| OOI & SCENE-BASED COMPRESSION (OSBC) | ● | ● |
| OOI-AIDED MACHINE VISION INSPECTION (OMVI) | ● | |
| PRIVACY ACT/SECURITY FRIENDLY OOI ID & ANALYSIS (PFOA) | ● | |
| OOI VISUAL SEARCH INTERFACE (NON - SEMANTIC) (OVSI) | ● | ● |

● = INDICATES TYPES OF INVENTION CLASSES USED BY APP

FIG. 18 A.

● = INDICATES TYPES OF INVENTION CLASSES USED BY APP

| INVENTION CLASSES & CODES: | BODY SCANNED OOI & SELECTION | ROBOTIC DIRECTED GUIDANCE & LEARNING INPUT | MANUFACTURING & MAINTENANCE MATERIAL DEFECT DETECTION | STRUCTURAL ANALYSIS | MATERIAL DEFECT ID & GRADING OF ORGANIC & INORGANIC GOODS | EXPERIMENT DOCUMENTATION & FOUND OBJECTS & PATTERN ID |
|---|---|---|---|---|---|---|
| RAPID IMAGE SCENE OBJECT (-N) DIMENSIONAL MAPPING & RECORDING (SOMR) | ● | ● | ● | ● | ● | ● |
| OOI ID (OOID) | ● | ● | ● | ● | ● | ● |
| PATTERN TRAINING DATA GENERATION (PTDG) | ● | ● | ● | ● | ● | ● |
| RAPID OBJECT-CLASS ID (OCID) | ● | ● | ● | ● | ● | ● |
| OOI PATTERN ID (OPID) | ● | ● | ● | ● | ● | ● |
| OOI PATTERN RE-COGNITION (OPRC) | ● | ● | ● | ● | ● | ● |
| OOI DIFFERENTIAL DATA ANALYSIS (ODDA) | ● | ● | ● | ● | ● | ● |
| OOI MOTION VECTOR RECORDING (OMVR) |  | ● |  | ● |  | ● |
| TEMPORAL RESOLUTION CALIBRATION OF COLLECTION ARRAYS (TRCA) |  | ● | ● | ● | ● | ● |
| APP-DRIVEN OOI SELECTION (ADOS) | ● | ● | ● | ● | ● |  |
| INTER-IMAGE SCENE MOTION VECTOR TRACKING & ANALYSIS (IMVT) |  | ● |  | ● |  |  |
| OOI SCENE POSITION PREDICTION (OSPP) | ● | ● | ● | ● | ● |  |
| OOI & SCENE-BASED COMPRESSION (OSBC) | ● |  |  |  |  |  |
| OOI-AIDED MACHINE VISION INSPECTION (OMVI) | ● |  | ● | ● | ● |  |
| OOI ID & ANALYSIS PRIVACY ACT/SECURITY FRIENDLY (PFOA) | ● |  |  |  |  |  |
| OOI VISUAL SEARCH INTERFACE (NON-SEMANTIC) (OVSI) | ● | ● | ● | ● | ● | ● |

IDENTIFIED APPLICATIONS OF THE INVENTION: MACHINE VISION IMAGING (GENERALIZED)

FIG. 18 B.

● = INDICATES TYPES OF INVENTION CLASSES USED BY APP

| INVENTION CLASSES & CODES | MACHINE VISION IMAGING (GENERALIZED) | | |
|---|---|---|---|
| | PARTICLE & SUB PARTICLE MAPPING & COURSE PREDICTION | NANOGRAM & (N) NOMINAL & EXPONENT TIME ALGORITHMS ANALYSIS | PARTS ID & INVENTORY GENERATION |
| RAPID IMAGE SCENE OBJECT (-N) DIMENSIONAL MAPPING & RECORDING (SOMR) | ● | ● | ● |
| OOI ID (OOID) | ● | ● | ● |
| PATTERN TRAINING DATA GENERATION (PTDG) | ● | ● | ● |
| RAPID OBJECT-CLASS ID (OCID) | ● | ● | ● |
| OOI PATTERN ID (OPID) | ● | ● | ● |
| OOI PATTERN RE-COGNITION (OPRC) | ● | ● | ● |
| OOI DIFFERENTIAL DATA ANALYSIS (ODDA) | ● | ● | ● |
| OOI MOTION VECTOR RECORDING (OMVR) | ● | ● | |
| TEMPORAL RESOLUTION CALIBRATION OF COLLECTION ARRAYS (TRCA) | ● | ● | ● |
| APP-DRIVEN OOI SELECTION (ADOS) | | ● | ● |
| INTER-IMAGE SCENE MOTION VECTOR TRACKING & ANALYSIS (IMVT) | ● | | |
| OOI SCENE POSITION PREDICTION (OSPP) | ● | ● | ● |
| OOI & SCENE-BASED COMPRESSION (OSBC) | | | |
| OOI-AIDED MACHINE VISION INSPECTION (OMVI) | ● | ● | ● |
| PRIVACY ACT/SECURITY FRIENDLY OOI ID & ANALYSIS (PFOA) | | | |
| OOI VISUAL SEARCH INTERFACE (NON-SEMANTIC) (OVSI) | ● | ● | ● |

IDENTIFIED APPLICATIONS OF THE INVENTION

FIG. 18 C.

*INVENTION CLASSES & CODES:*

| IDENTIFIED APPLICATIONS OF THE INVENTION: DIGITAL RIGHTS MANAGEMENT (DRM) | RAPID IMAGE SCENE OBJECT (-N) DIMENSIONAL MAPPING & RECORDING (SOMR) | OOI ID (OOID) | PATTERN TRAINING DATA GENERATION (PTDG) | RAPID OBJECT-CLASS ID (OCID) | OOI PATTERN ID (OPID) | OOI PATTERN RE-COGNITION (OPRC) | OOI DIFFERENTIAL DATA ANALYSIS (ODDA) | OOI MOTION VECTOR RECORDING (OMVR) | TEMPORAL RESOLUTION CALIBRATION OF COLLECTION ARRAYS (TRCA) | APP-DRIVEN OOI SELECTION (ADOS) | INTER-IMAGE SCENE MOTION VECTOR TRACKING & ANALYSIS (IMVT) | OOI SCENE POSITION PREDICTION (OSPP) | OOI & SCENE-BASED COMPRESSION (OSBC) | OOI-AIDED MACHINE VISION INSPECTION (OMVI) | PRIVACY ACT/SECURITY FRIENDLY OOI ID & ANALYSIS (PFOA) | OOI VISUAL SEARCH INTERFACE (NON-SEMANTIC) (OVSI) |
|---|---|---|---|---|---|---|---|---|---|---|---|---|---|---|---|---|
| IP COMPLIANCE & ENFORCEMENT | ● | ● | ● | ● | ● | ● | ● | ● | ● | ● | ● |   | ● |   |   | ● |
| IMAGE & WAVEFORM SCENE-DRIVEN VARIABLE COMPRESSION | ● | ● | ● | ● | ● |   |   | ● |   | ● |   |   | ● |   |   |   |
| IMAGE & WAVEFORM SCENE-DRIVEN ENCODING | ● | ● | ● | ● | ● |   |   | ● |   | ● |   |   | ● |   |   |   |
| CONTENT REGISTRATION & AUTHENTICATION | ● | ● | ● | ● | ● | ● |   | ● | ● | ● | ● | ● | ● | ● | ● | ● |
| CONSUMER-BASED CONTENT PATTERN ID | ● | ● | ● | ● | ● | ● | ● |   |   | ● | ● |   |   |   | ● | ● |
| DIFFERENTIAL ID & ANALYSIS OF DERIVATIVE WORKS | ● | ● | ● | ● | ● | ● | ● | ● |   | ● | ● | ● | ● | ● | ● | ● |

● = INDICATES TYPES OF INVENTION CLASSES USED BY APP

FIG. 18 D.

| INVENTION CLASSES & CODES | CONSUMER OWNED DIGITAL CAMERAS: OBJECT ENCODING, ID & SEARCH | OBJECT SEARCH SHARING & MATCHING FOR NETWORKING & COMMERCE | AUTO-GENERATION OF INDEMNITY DOCUMENTATION OF ASSETS | DIGITAL PHOTO-GRAPHIC IMAGING | CONTENT IDENTIFICATION & SCENE METADATA GENERATION |
|---|---|---|---|---|---|
| RAPID IMAGE & SCENE OBJECT (-N) DIMENSIONAL MAPPING & RECORDING (SOMR) | ● | ● | ● |  | ● |
| OOI ID (OOID) | ● | ● | ● |  | ● |
| PATTERN TRAINING DATA GENERATION (PTDG) | ● | ● |  |  | ● |
| RAPID OBJECT-CLASS ID (OCID) | ● |  | ● |  | ● |
| OOI PATTERN ID (OPID) | ● | ● | ● |  | ● |
| OOI PATTERN RE-COGNITION (OPRC) | ● | ● | ● |  | ● |
| OOI DIFFERENTIAL DATA ANALYSIS (ODDA) | ● | ● |  |  | ● |
| OOI MOTION VECTOR RECORDING (OMVR) | ● | ● |  |  | ● |
| TEMPORAL RESOLUTION CALIBRATION OF COLLECTION ARRAYS (TRCA) | ● |  | ● |  | ● |
| APP-DRIVEN OOI SELECTION (ADOS) | ● | ● | ● |  | ● |
| INTER-IMAGE SCENE MOTION VECTOR TRACKING & ANALYSIS (IMVT) | ● | ● |  |  | ● |
| OOI SCENE POSITION PREDICTION (OSPP) | ● | ● |  |  | ● |
| OOI & SCENE-BASED COMPRESSION (OSBC) | ● | ● |  |  | ● |
| OOI-AIDED MACHINE VISION INSPECTION (OMVI) |  | ● | ● |  |  |
| PRIVACY ACT/SECURITY FRIENDLY OOI ID & ANALYSIS (PFOA) |  | ● | ● |  | ● |
| OOI VISUAL SEARCH INTERFACE (NON - SEMANTIC) (OVSI) | ● | ● | ● |  | ● |

● = INDICATES TYPES OF INVENTION CLASSES USED BY APP

IDENTIFIED APPLICATIONS OF THE INVENTION

FIG. 19A.

*INVENTION CLASSES & CODES:*

*IDENTIFIED APPLICATIONS OF THE INVENTION:*

NATURAL RESOURCES MANAGEMENT

● = INDICATES TYPES OF INVENTION CLASSES USED BY APP

| Application | RAPID IMAGE SCENE OBJECT (-N) DIMENSIONAL MAPPING & RECORDING (SOMR) | OOI ID (OOID) | PATTERN TRAINING DATA GENERATION (PTDG) | RAPID OBJECT-CLASS ID (OCID) | OOI PATTERN ID (OPID) | OOI PATTERN RE-COGNITION (OPRC) | OOI DIFFERENTIAL DATA ANALYSIS (ODDA) | OOI MOTION VECTOR RECORDING (OMVR) | TEMPORAL RESOLUTION CALIBRATION OF COLLECTION ARRAYS (TRCA) | APP-DRIVEN OOI SELECTION (ADOS) | INTER-IMAGE SCENE MOTION VECTOR TRACKING & ANALYSIS (IMT) | OOI SCENE POSITION PREDICTION (OSPP) | OOI & SCENE-BASED COMPRESSION (OSBC) | OOI-AIDED MACHINE VISION INSPECTION (OMVI) | OOI ID & ANALYSIS PRIVACY ACT/SECURITY FRIENDLY (PFOA) | OOI VISUAL SEARCH INTERFACE (NON-SEMANTIC) (OVSI) |
|---|---|---|---|---|---|---|---|---|---|---|---|---|---|---|---|---|
| LAND MANAGEMENT | ● | ● | ● | ● | ● | ● | ● | ● | ● | ● | ● | ● | ● | ● | ● | ● |
| FORESTRY RESOURCES | ● | ● | ● | ● | ● | ● | ● | ● | ● | ● | ● | ● | ● | ● | ● | ● |
| MINERALS & RARE EARTH MATERIALS RESOURCES | ● | ● | ● | ● | ● | ● | ● | ● | ● | ● | ● | ● | ● | ● | ● | ● |
| FISHERY RESOURCES | ● | ● | ● | ● | ● | ● | ● | ● | ● | ● | ● | ● | ● | ● | ● | ● |
| WEATHER (WX) IMAGING FOR MODELING | ● | ● | ● | ● | ● | ● | ● | ● | ● | ● | ● | ● | ● | ● | ● | ● |
| FARMING | ● | ● | ● | ● | ● | ● | ● | ● | ● | ● | ● | ● | ● | ● | ● | ● |
| OCEANOGRAPHIC SURVEYS | ● | ● | ● | ● | ● | ● | ● | ● | ● | ● | ● | ● | ● | ● | ● | ● |
| HYDROGRAPHIC SURVEYS | ● | ● | ● | ● | ● | ● | ● | ● | ● | ● | ● | ● | ● | ● | ● | ● |

FIG. 19 B.

| INVENTION CLASSES & CODES | MULTIMEDIA EFFLUENT OOI ID & SELECTION | FATE & TRANSPORT OF HAZARDOUS MATERIALS | SITE IMAGING OF RELEASES & CONTAMINATIONS | FLOW & EFFLUENT MONITORING | INSPECTION OF REMEDIATION TECHNOLOGIES & SYSTEMS | ITEM ID & 'PICKING' CRITERIA GENERATION |
|---|---|---|---|---|---|---|
| | *ENVIRONMENTAL MANAGEMENT IMAGING* | | | | | *WASTE MANAGEMENT IMAGING* |
| RAPID IMAGE SCENE OBJECT (-N) DIMENSIONAL MAPPING & RECORDING (SOMR) | ● | ● | ● | ● | | ● |
| OOI ID (OOID) | ● | ● | ● | ● | ● | ● |
| PATTERN TRAINING DATA GENERATION (PTDG) | ● | ● | ● | ● | ● | ● |
| RAPID OBJECT-CLASS ID (OCID) | ● | ● | ● | ● | | ● |
| OOI PATTERN ID (OPID) | ● | ● | ● | ● | ● | ● |
| OOI PATTERN RE-COGNITION (OPRC) | ● | ● | ● | ● | ● | ● |
| OOI DIFFERENTIAL DATA ANALYSIS (ODDA) | ● | ● | ● | ● | ● | ● |
| OOI MOTION VECTOR RECORDING (OMVR) | | ● | ● | ● | ● | |
| TEMPORAL RESOLUTION CALIBRATION OF COLLECTION ARRAYS (TRCA) | | ● | ● | ● | ● | ● |
| APP-DRIVEN OOI SELECTION (ADOS) | ● | ● | ● | ● | | ● |
| INTER-IMAGE SCENE MOTION VECTOR TRACKING & ANALYSIS (IMVT) | | ● | ● | ● | ● | |
| OOI SCENE POSITION PREDICTION (OSPP) | ● | ● | ● | ● | ● | ● |
| OOI & SCENE-BASED COMPRESSION (OSBC) | ● | | ● | ● | ● | ● |
| OOI-AIDED MACHINE VISION INSPECTION (OMVI) | ● | ● | ● | ● | ● | ● |
| PRIVACY ACT/SECURITY FRIENDLY OOI ID & ANALYSIS (PFOA) | | | | | | |
| OOI VISUAL SEARCH INTERFACE (NON-SEMANTIC) (OVSI) | ● | ● | ● | ● | ● | ● |

● = INDICATES TYPES OF INVENTION CLASSES USED BY APP

FIG. 20 A.

| INVENTION CLASSES & CODES | RAPID EPHERMERIS DATA CALCULATIONS & MASS RECORDING | INTRA & INTER SCENE COURSE PREDICTION | MAPPING & IMAGE REGISTRATION TO NAV INSTRUMENT MEASURANDS | RAPID CELESTIAL, TERRESTRIAL & INNER SPACE MAPPING |
|---|---|---|---|---|
| RAPID IMAGE SCENE OBJECT (-N) DIMENSIONAL MAPPING & RECORDING (SOMR) | ● | ● | ● | ● |
| OOI ID (OOID) | ● | ● | ● | ● |
| PATTERN TRAINING DATA GENERATION (PTDG) | ● | ● | ● | ● |
| RAPID OBJECT-CLASS ID (OCID) | ● | ● | ● | ● |
| OOI PATTERN ID (OPID) | ● | ● | ● | ● |
| OOI PATTERN RE-COGNITION (OPRC) | ● | ● | ● | ● |
| OOI DIFFERENTIAL DATA ANALYSIS (ODDA) | ● | ● | ● | ● |
| OOI MOTION VECTOR RECORDING (OMVR) | ● | ● | ● | ● |
| TEMPORAL RESOLUTION CALIBRATION OF COLLECTION ARRAYS (TRCA) | ● | ● | ● | ● |
| APP-DRIVEN OOI SELECTION (ADOS) | ● | ● | ● | ● |
| INTER-IMAGE SCENE MOTION VECTOR TRACKING & ANALYSIS (IMVT) | ● | ● | ● | ● |
| OOI SCENE POSITION PREDICTION (OSPP) | ● | ● | ● | ● |
| OOI & SCENE-BASED COMPRESSION (OSBC) | ● |   |   | ● |
| OOI-AIDED MACHINE VISION INSPECTION (MVI) | ● | ● | ● | ● |
| PRIVACY ACT/SECURITY FRIENDLY OOI ID & ANALYSIS (PFOA) |   |   |   |   |
| OOI VISUAL SEARCH INTERFACE (NON-SEMANTIC) (OVSI) | ● | ● | ● | ● |

*IDENTIFIED APPLICATIONS OF THE INVENTION:* TERRESTRIAL & CELESTIAL NAVIGATION

● = INDICATES TYPES OF INVENTION CLASSES USED BY APP

FIG. 20 B.

| INVENTION CLASSES & CODES: | RAPID IMAGE SCENE OBJECT (-N) DIMENSIONAL MAPPING & RECORDING (SOMR) | OOI ID (OOID) | PATTERN TRAINING DATA GENERATION (PTDG) | RAPID OBJECT-CLASS ID (OCID) | OOI PATTERN ID (OPID) | OOI PATTERN RE-COGNITION (OPRC) | OOI DIFFERENTIAL DATA ANALYSIS (ODDA) | OOI MOTION VECTOR RECORDING (OMVR) | TEMPORAL RESOLUTION CALIBRATION OF COLLECTION ARRAYS (TRCA) | APP-DRIVEN OOI SELECTION (ADOS) | INTER-IMAGE SCENE MOTION VECTOR TRACKING & ANALYSIS (IMAT) | OOI SCENE POSITION PREDICTION (OSPP) | OOI & SCENE-BASED COMPRESSION (OSBC) | OOI-AIDED MACHINE VISION INSPECTION (OMVI) | PRIVACY ACT/SECURITY FRIENDLY OOI ID & ANALYSIS (PFOA) | OOI VISUAL SEARCH INTERFACE (NON - SEMANTIC) (OVSI) |
|---|---|---|---|---|---|---|---|---|---|---|---|---|---|---|---|---|
| IDENTIFIED APPLICATIONS OF THE INVENTION: *MAPPING & CARTOGRAPHY* | | | | | | | | | | | | | | | | |
| TERRAIN ID & CODING | ● | ● | ● | ● | ● | ● | ● | | ● | ● | | | | ● | | ● |
| MAP & OVERLAY REGISTRATION | ● | ● | ● | ● | ● | ● | ● | ● | ● | ● | ● | ● | | ● | | ● |
| ARCHEOLOGICAL SEARCH PATTERN GENERATION & SITE INVESTIGATION | ● | ● | ● | ● | ● | ● | ● | ● | ● | ● | ● | ● | | ● | | ● |

● = INDICATES TYPES OF INVENTION CLASSES USED BY APP

FIG. 20 C.

INVENTION CLASSES & CODES:

- RAPID IMAGE SCENE OBJECT (-N) DIMENSIONAL MAPPING & RECORDING (SOMR)
- OOI ID (OOID)
- PATTERN TRAINING DATA GENERATION (PTDG)
- RAPID OBJECT-CLASS ID (OCID)
- OOI PATTERN ID (OPID)
- OOI PATTERN RE-COGNITION (OPRC)
- OOI DIFFERENTIAL DATA ANALYSIS (ODDA)
- OOI MOTION VECTOR RECORDING (OMVR)
- TEMPORAL RESOLUTION CALIBRATION OF COLLECTION ARRAYS (TRCA)
- APP-DRIVEN OOI SELECTION (ADOS)
- INTER-IMAGE SCENE MOTION VECTOR TRACKING & ANALYSIS (IMVT)
- OOI SCENE POSITION PREDICTION (OSPP)
- OOI & SCENE-BASED COMPRESSION (OSBC)
- OOI-AIDED MACHINE VISION INSPECTION (OMVI)
- PRIVACY ACT/SECURITY FRIENDLY OOI ID & ANALYSIS (PFOA)
- OOI VISUAL SEARCH INTERFACE (NON - SEMANTIC) (OVSI)

IDENTIFIED APPLICATIONS OF THE INVENTION: TRANSPORT & LOGISTICS IMAGING

● = INDICATES TYPES OF INVENTION CLASSES USED BY APP

| Invention Class | SUSPICIOUS PACKAGE ID | OFFICIAL SEALS & STAMPS ID | AUTOMATIC MANIFEST ID & GENERATION | CONTAINER INSPECTION | CONTAINER, BAGGAGE & PACKAGE RECORDING & ID FOR THREAT ANALYSIS | VEHICLE ID & MAPPING FOR INFRASTRUCTURE PLANNING | MASS BODY SCAN OBJECT ID & RECORDING |
|---|---|---|---|---|---|---|---|
| SOMR | ● | ● |   | ● | ● | ● | ● |
| OOID | ● | ● | ● | ● |   | ● | ● |
| PTDG | ● | ● | ● | ● | ● | ● | ● |
| OCID | ● | ● | ● | ● | ● | ● | ● |
| OPID | ● | ● | ● | ● | ● | ● | ● |
| OPRC | ● | ● | ● | ● | ● | ● | ● |
| ODDA | ● | ● | ● | ● | ● | ● | ● |
| OMVR |   |   |   |   |   | ● | ● |
| TRCA |   | ● |   |   |   | ● | ● |
| ADOS | ● | ● | ● | ● | ● | ● | ● |
| IMVT |   |   |   |   | ● | ● | ● |
| OSPP | ● | ● | ● | ● | ● | ● | ● |
| OSBC | ● | ● | ● | ● | ● | ● | ● |
| OMVI | ● | ● | ● | ● | ● | ● | ● |
| PFOA | ● | ● | ● | ● | ● | ● | ● |
| OVSI | ● | ● | ● | ● | ● | ● | ● |

FIG. 21A.

● = INDICATES TYPES OF INVENTION CLASSES USED BY APP

| INVENTION CLASSES & CODES: / IDENTIFIED APPLICATIONS OF THE INVENTION: | RAPID IMAGE SCENE OBJECT (-N) DIMENSIONAL MAPPING & RECORDING (SOMR) | OOI ID (OOID) | PATTERN TRAINING DATA GENERATION (PTDG) | RAPID OBJECT-CLASS ID (OCID) | OOI PATTERN ID (OPID) | OOI PATTERN RE-COGNITION (OPRC) | OOI DIFFERENTIAL DATA ANALYSIS (ODDA) | OOI MOTION VECTOR RECORDING (OMVR) | TEMPORAL RESOLUTION CALIBRATION OF COLLECTION ARRAYS (TRCA) | APP-DRIVEN OOI SELECTION (ADOS) | INTER-IMAGE SCENE MOTION VECTOR TRACKING & ANALYSIS (IMAT) | OOI SCENE POSITION PREDICTION (OSPP) | OOI & SCENE-BASED COMPRESSION (OSBC) | OOI-AIDED MACHINE VISION INSPECTION (OMVI) | OOI ID & ANALYSIS PRIVACY ACT/SECURITY FRIENDLY (PFOA) | OOI VISUAL SEARCH INTERFACE (NON - SEMANTIC) (OVSI) |
|---|---|---|---|---|---|---|---|---|---|---|---|---|---|---|---|---|
| GAMING MANAGEMENT | | | | | | | | | | | | | | | | |
| GAME SCENE ANALYSIS & MASS RECORDING | ● | ● | ● | ● | ● | ● | ● | ● | ● | ● | ● | ● | ● | ● | ● | ● |
| FRAUD PATTERN DETECTION | ● | ● | ● | ● | ● | ● | ● | ● | ● | ● | ● | ● | ● | ● | ● | ● |
| ASSET THEFT & SHRINKAGE ANALYSIS | ● | ● | ● | ● | ● | ● | ● | ● | ● | ● | ● | ● | ● | ● | ● | ● |
| BODY LANGUAGE ID PATTERN RECORDING & ANALYSIS | | ● | ● | | ● | ● | ● | ● | ● | ● | ● | ● | ● | ● | ● | ● |
| SPORTS | | | | | | | | | | | | | | | | |
| FORM & PERFORMANCE TRAINING DATA | ● | ● | ● | ● | ● | ● | ● | ● | ● | ● | ● | ● | ● | ● | ● | ● |
| PLAYER PLACEMENT ID & PREDICTION | ● | ● | ● | ● | ● | ● | ● | ● | ● | ● | ● | ● | ● | ● | | ● |

FIG. 21B.

| INVENTION CLASSES & CODES | PRODUCT PART ID, ASSEMBLY & MAINTENANCE PROCEDURE RECORDING (TRAINING) | TASK & PROCESS FLOW PROCEDURES RECORDING & ANALYSIS | FASHION | PATTERN ID FOR CONSUMER RESEARCH |
|---|---|---|---|---|
| RAPID IMAGE SCENE OBJECT (-N) DIMENSIONAL MAPPING & RECORDING (SOMR) | ● | ● |  | ● |
| OOI ID (OOID) | ● | ● |  | ● |
| PATTERN TRAINING DATA GENERATION (PTDG) | ● | ● |  | ● |
| RAPID OBJECT-CLASS ID (OCID) | ● | ● |  | ● |
| OOI PATTERN ID (OPID) | ● | ● |  | ● |
| OOI PATTERN RE-COGNITION (OPRC) | ● | ● |  | ● |
| OOI DIFFERENTIAL DATA ANALYSIS (ODDA) | ● | ● |  | ● |
| OOI MOTION VECTOR RECORDING (OMVR) | ● | ● |  |  |
| TEMPORAL RESOLUTION CALIBRATION OF COLLECTION ARRAYS (TRCA) | ● | ● |  |  |
| APP-DRIVEN OOI SELECTION (ADOS) | ● | ● |  | ● |
| INTER-IMAGE SCENE MOTION VECTOR TRACKING & ANALYSIS (IMVT) | ● | ● |  |  |
| OOI SCENE POSITION PREDICTION (OSPP) | ● | ● |  |  |
| OOI & SCENE-BASED COMPRESSION (OSBC) | ● | ● |  | ● |
| OOI-AIDED MACHINE VISION INSPECTION (OMVI) | ● | ● |  | ● |
| PRIVACY ACT/SECURITY FRIENDLY OOI ID & ANALYSIS (PFOA) | ● | ● |  | ● |
| OOI VISUAL SEARCH INTERFACE (NON - SEMANTIC) (VSI) | ● | ● |  | ● |

● = INDICATES TYPES OF INVENTION CLASSES USED BY APP

SYSTEM AND METHOD TO FIND THE PRECISE LOCATION OF OBJECTS OF INTEREST IN DIGITAL IMAGES

This application claims the benefit of U.S. Provisional Patent Application Ser. No. 61/371,460, in the names of Michael Kennedy, et. al. filed Aug. 6, 2010, the disclosure of which is expressly incorporated herein by reference in its entirety.

BACKGROUND OF THE INVENTION

1. Field of the Invention

The present invention is related to relationship and composition features (objects) detection, identification, extraction, reduced instruction set recording, pattern matching, storage and retrieval of an Image scene inter-frame object motion mapping and course prediction, search area isolation of pattern matched objects and prediction of a pattern matched presence of objects in scenes where features of objects are not present.

More particularly, the invention is directed to using features of objects, or feature domains identified by the methods of the invention, to encode or re-encode imagery for the purposes of: (a) reducing the size of images, (b) improving the rendering accuracy and performance of image content within or without existing image format methods, (d) providing a non-intuitive scheme for secure transmission and storage of imagery. The invention is also directed to calculating the degree of dissimilarities between features of objects to be stored for subsequent retrieval for the purposes of identifying anomalies between stored object features and comparisons with master templates (training models) used for pattern matching.

2. Background of the Invention and Related Art

The present invention is driven by the process problem of identifying application relevant objects of interest, being logically organized data; text fields, symbols, morphology; living cells, energy waves, textures. Other methods in the related art that may be substituted for the present invention primarily approach the problem as a known linear distance and orientation solution: specifically, between the known linear distance of a user-defined master template. This strict distance relationship approach only works when the linear distance applies i.e., in many real world scenarios the position of the object of interest will vary, therefore making this approach only relevant when the distance and relative orientation are similar.

Some other methods in the related art take an upfront approach of pre processing the digital image to make it more suitable for negating false positives by;

1. Threshold approaches and methods for binarizing the image scene,
2. Removing contiguous lines,
3. Removing contiguous pixel blobs or 'specs'

All of these false positive elimination techniques will be useless when the linear distance and relative orientation are not similar.

A Fuzzy logic approach is used when objects that do not meet the algorithm thresholds are attempted to be identified by changing the weighting criteria to accommodate the calculated results of a given image scene. The results of skewing (or mathematically 'pushing' data) in a fuzzy logic approach is that the identified object is too often not an application-relevant object element and not an object of interest. Therefore, this approach yields inferior results by virtue of the high probability of designating too many false positives. Where, false positives will require an alternative process or a human to solve the original problem. However, using an alternate process or a human to manually designate the objects of interest, removes all possible efficiencies that may otherwise be gained by using a fuzzy logic-based follow on approach and process to solve the required linear distance and orientation calculations.

Other methods in the related art use an optical character recognition technology as a pre process for identifying character string objects of interest, based on a master string template approach. Using a primarily OCR-driven approach relies on the following to obtain statistically significant locations of character objects of interest:

(a) Image scenes that contain sufficient levels of object element(s) contrast to make dynamic range composition changes; (wave form analysis, various methods of transformations) in order to effectively perform step (b) and/or fine object (close radius) edge detection processes.
(b) Directed noise and intersecting object removal to enable effective character recognition processes.
(c) The image scene presence of exact and/or rules-based exceptional character sets string detection and recognition
(d) The preconditions of (a)-(c) for enabling the object element vectors of hand written character data.

A known variation on the OCR approach is to segment a character into is composed elements, so that if some of the character elements or parts are obscured, not present or intersected by other objects or noise, the remaining pieces can be subjected to a modified OCR process.

In machine vision-focused and generalized targeting methods a variety of approaches are used:

(a) Using an imposed template or mask that is guided (either manually or via some other method of automation) to its target.
(b) Calculating an azimuth drift or relative value of the nadir of the image collection array to estimate orientation, which may also be constrained by approach (a), above.

Approaches in other methods in the related art do not incorporate an accurate and therefore, efficient method of identifying Character vs. non character objects, which does not use forms of optical character recognition (OCR) pattern recognition. This approach is ineffective for non character objects, as OCR pattern recognition only identifies the presence of a matched or potentially matched character formation. Therefore, if the inference of the non presence of a formed character is used to indicate a non character object, too many false positives will result to make the designations statistically significant.

The present invention is in stark contrast to all known prior art which relies on solving for:

(1) the relative distance between estimated objects of interest in order to find the estimated location of the object type that matches the designated master object type.
(2) the estimated location of coordinate boundaries of objects that significantly match the designated master object types along an established vector.

All raster images are divided up using a 2D coordinate system based upon the image picture element density (pixels) or resolution. This method of dividing up the image area is typically identified in the related art and public domain knowledge as 'page navigation' as taught by Matsuo, et. al. in U.S. Pat. No. 5,852,675. Also, see chaps 3 and 4 viz., Photometric Restoration of Documents and Geometric Restoration of Documents, and the cited work of W. Brent Seales, in doctoral dissertation by George V. Landon, Jr., College of Engineering at the University of Kentucky, 2008, which is available at: http://cslinux.eku.edu/landong/papers/landon-dissertation.pdf. Page navigation in raster image types uses a Cartesian coordinate system for applications of: document imaging, medical and machine vision applications.

Commonly, existing art technologies use a standard calculus numerical integration method to count units between estimated objects of interest as horizontal or vertical line units or sets or measurement. Once the distance of an estimated object of interest is deduced from a numerical integration method it is used to determine:

1. If the relative anticipated or assumed distance corresponds to the parameters that were designated by the human manual or machine trained master object selection process.
2. If the deduced distance does correspond to the parameters (given in item 1. above) then, the estimated location can be calculated.

However, the entire approach used in known art technologies relies upon whether the sought object of interest resides in the anticipated location, and if the sought object of interest does reside in the anticipated location, then its estimated coordinate boundaries are calculated based upon the numerical integration deductive process of the relative distance and anticipated vector from other objects of interest that were used to derive the sought object's estimated location.

The limitations of using known art methods is that, at best the location is only an estimate and not the actual location of the coordinate boundaries of the object of interest and any post process will only be able to consider the part of the contained object of interest that fits into the estimated boundaries (e.g., in fielded OCR post processes), only some of the pixels can be possible to read to generate output text.

It is instead more desirable to calculate the actual location of object of interest boundaries. For process applications, the objective is to encompass the entire object of interest, as is disclosed in the present invention. In OCR applications, this is the entire string of character data.

It is also more desirable to be liberated from finding object coordinate boundaries of interest directly from numerical integration calculations of known or estimated to be known objects. An example application using this principle can be seen in document imaging, where photo copying documents typically either reduces or enlarges the document image to accommodate the full output to the paper. The location of potential objects of interest will be materially altered by this process when the paper image is digitally captured and estimated using an integration method. This outcome is certain because integration methods do not take into account changed proportions and, or changed orientations of potential objects of interest. The present invention is not constrained by proportional obstacles since it does not use any numerical integration method to calculate the distance between objects of interest.

Another example of desirability for not being confined to finding objects of interest by calculating relative distances can also be seen in document imaging applications when sought field objects dynamically change in position and from image to image either slightly or radically due to print restrictions in a batch run e.g., a transaction on a phone record may be indented or reformatted due to a billing code, warning or advertisement in line on a statement.

Accuracy is a consequence tied to efficiency in object recognition tasks because, any object improperly designated will generate a false positive, which negates the intended automation benefits of the technology and invention. Thus, a method is needed to find the precise location of objects of interest in digital images which uses human manual and, or machine vision trained input to supply a set of example objects or a singular master image object to derive and record the location of the objects (a process of mapping) of interest.

SUMMARY OF THE INVENTION

In the present invention, the following terminology is used to express particular concepts, however, it is not intended to be limiting:

Area of Influence (AOI) is an axonometric projection of an encompassing Area surrounding an object of interest (OOI), expressed as a circle for 2D methods of the invention, shown in detail in FIG. 11, and FIG. 10 for 3D and additive dimensions or (-n), where the circular plot is given in sets of (x, y) relative to (z'), so that the result in greater than 3D problems will be plotted as a sphere with its planes relative to the (z") of each (x, y) set. For See definition below for OOI.

Coglyph is the data set of the structure of a contiguous arrangement of pixels and its tangential boundaries, which are calculated, retained and recorded with the inter object of interest (OOI) relationship symbol, termed 'glyph' (by the invention) for the purposes of referencing a granular morphological configuration for subsequent recording of complex morphology comparisons and pattern identification applications.

Color Correction is a process that calculates a given image's color value table(s) and converts new values for each pixel based on another color table/color model method for the goal of creating a 'normalized' effect. Where, the normalization allows recognition/interpretation features to become more apparent. A color normalization process or 'adjustment' can be said to be an approach to de-emphasize features like artifacts to improve an image's overall contrast resolution.

Contrast Resolution is the sum total of physical distance separation of sets of contiguous pixels that comprise recognition features in a digital image scene, expressed as either an individual feature distance relationship and/or as an average distance in an image region or full image scene. For e.g., if a digital image scene comprises a chess board with $8^2$ squares with all the pieces, the contrast resolution of individual squares on the board are the same linear distance as one side of a square or about 50 mm. However, if the board is divided up into quadrants as regions, and the distances in which the pieces reside from adjacent pieces averages about 22% of each square in which they reside, then the contrast resolution of $4^2$ squares (the region) is 40 mm.

Dimensional Plane References comprise each coherent 3D relationship composed of (x, y, z) and additional planes or (-n) as represented and calculated by the preferred embodiment of the invention as:

$$\Sigma[x_{n-\infty}, y_{n-\infty}, z_{n-\infty}].$$

Edge Detection is a method of applying an algorithm that calculates arrangements of pixels, based on their contiguous order and/or contrast resolution values, compared to surrounding pixels. The comparison of pixels having contiguous order based on their contrast resolution values to surrounding pixels determines features known in the art as boundaries and contours. The resulting boundaries and contours are considered by machine vision and human interpretation processes to render interpretable features, or what is referred to in the art as 'recognition features of an edge' for a given object.

Glyph is a symbol and method of expressing a relationship of an object of interest (OOI) to another OOI in an image scene.

Image Artifact is a pixel or set of pixels that does not appear in an image's source, or appears in a different plot or placement as the source, which was either the physical material from which the image was digitally acquired or a digital source of raw or encoded data. An e.g., of a common artifact can be seen in baseline JPEG compression, where the continuous tone grouping of pixels typically plots over and out of the boundaries of a contrast recognition feature like a filled character or box, which gives the image a blotchy effect when zoomed. The main reason for this effect is that the JPEG encoding scheme does not have an accurate method for recording the placement of encoded elements, which is referred to in the art as an image's temporal resolution.

Object of Interest (OOI) is a coherent set of contiguous pixels that has undergone the methods given in the invention, which are used to plot a centroid, from which an Area of influence (AOI) is calculated and formed by the methods of the present invention.

Pixel is an abbreviation of the term picture elements, in which the size or relative scale of the grid coordinates of an image's planes may vary inter-dimensionally, or inner-dimensionally in the same plane e.g., as a consequence of data corruption and/or warping effects due to improper signal reception of the photons or other type of radiated energy source upon the materials used to collect the energy quantity and types; such as the well-effect of charged coupled devices (CCDs) arrays commonly used in digital image photon capture.

Recognition Feature is a set of contiguous and/or contrasted pixels which enable either a machine vision method or a human observer to be able to distinguish a dependent element of a set of dependent components of an object that meets a classification definition e.g., on a 1908-1922 US Postage stamp of George Washington, the set of contiguous pixels that compose the contour and boundary of the neck of his toga intersect with the circular area and contrasted depression of the toga button. In this case, the contiguous set of pixels that compose the area of the button and the vertical lines on the interior of the button, are each themselves recognition features.

Temporal Resolution is a representation of the quantity of time or 't', in which a linear value of a contiguous and/or non contiguous arrangement of pixels requires to traverse a given spline or splines in the dimensional planes of signal response tasks performed by the invention; expressed as $[t=-n_{n-\infty}]$, or the temporal resolution quantity of a glyph formation. Where, the exterior temporal resolution quantity is the amount of time in which a data acquisition device and/or system requires to traverse the given linear distance of the spline or splines to be calculated.

Temporal resolution is an important, but often ignored concept in digital signal response science because, it is a measurement that can influence the discreetness of pixel arrangements e.g., contiguous vs. non contiguous, as the nadir of the signals' collection or acquisition device is always a relative measurement of the span of the pixel resolution and must be taken into account and consideration for very high resolution contiguous and non contiguous sets. The measurements change relative to nadir and collection signal quality or reception of a fixed or transported collection array. Temporal resolution delta calculations are typically built into pre and post processes and not accounted for separately. A few art technologies employ micro array transports such as Piezo plate approaches for collecting each fraction of a pixel or fractional step, rather than whole pixel steps to provide enough significant tracking data to solve for temporal signal response desynchronization of nadir issues.

The relative delta of the nadir of the imaging plane to the nadir of the collection device can significantly change the distance of pixels in proximity to each other for making a granular determination of fragmented vs. non fragmented set formations for methods such that the preferred embodiment of the invention performs for the determination of objects of interest (OOIs) vs. fragments and/or artifacts in an image scene.

In the present invention, the Glyph is a ubiquitous elemental concept that runs through our methods. The term 'Glyph' was selected to describe the relationship of objects of interest (OOIs) within an image scene or space. The term Glyph originated in ancient Greece to mean a carved or formed symbol, or figure that imparts information, non-verbally.

The present invention uses the Glyph to record, reference and recognize relationships between OOIs and sought data that are known about how the OOIs are likely to reside in the image scene. These known data sets are called the master object of interest or MOIs.

A Glyph is formed when a set of OOIs are in proximity of each other. Candidate zones in an image scene are analyzed using a rules-base algorithm that takes into account such factors as noise suppression, edge detection and methods to identify patterns of contiguous organization. All of which are used to separate statistically likely OOI features from probable artifacts, that are not likely to be relevant to OOI determination. The algorithm optionally allows users to set the level of discrimination for statistical significance for determining application-relevant features. Waypoint lines are plotted to connect the tangents of the circle surrounding the resulting candidate OOI, along with a center line or centroid. The resulting waypoint guides form a constrained path in which to project the OOI along the guide lines, so that an offset rule determines the distance from the center or origin of the circle of the OOI in which to form an overlap or area of influence. The formed overlap determines the Glyph coordinates. Once a Glyph is formed and the coordinates are calculated, the unique relationship of the OOI set for the given image scene is known.

Glyph properties are recorded by the methods of the present invention. Properties of the Glyph are recorded using a concentric circle workspace that functions as a visual or spatial database. The workspace functions as a device that can be stored within any hybrid file format as a scalable vector graphic and properties of the vector stored as a metadata layer within the file e.g., XML. Each glyph is plotted in a concentric ring according to its correct orientation, which is determined by its residing position in the image space. The number of OOIs in a given image scene determines the number of concentric circles of the glyph workspace as an order of magnitude factor. The scaled vector graphic nature of the glyph workspace database allows two inherited functions for security and compression efficiency. Two or more glyphs form a set called a progression, and each progression undergoes a geometric series of calculations to determine the degrees of constrained drift or variation in its orientation. Individual glyphs undergo an additional process of ordered variation by calculating a determined ordered variation. This information is used to record pattern matching criteria that takes into account variations of orientation due to effects of weak or incomplete signal interference or other types of distortions. In addition to pattern matching training set inclusion, the constrained degrees of drift are projected in a series of orders to eliminate the dependence on fuzzy logic approaches and methods. Another inherited feature of the technology used to generate the ordered constrained drifts is the reduction or elimination of the traditional user burden of designating 'known' or anticipated degrees of variation as a value judgment. MOI defined templates are recorded in similar ways to the glyph work space database, where only the user-designated OOIs are recorded. Any amount of OOIs in the image scenes used to form the MOI can be recorded based upon the application and user-driven requirements.

Glyph progressions are analyzed to produce recognized patterns. Recorded OOIs are compared to MOI glyph workspaces by determining the degree of match of the primary plot of the glyph progressions, the recorded ordered variations and the user-defined degree of tolerance that controls the number of ordered variations and the overall level of match or confidence of a matched pattern. An inherited feature of the approach used for glyph progression is that each matched OOI from a recorded glyph progression can be measured as a difference between the stored MOI position in the image scene and the found position. Each difference, once recorded is used as training data that updates the MOI set catalog. Usually, this type of training data is entered manually.

Uses for the present invention include: identifying the changed locations of manually designated objects of interest when a digital image varies in proportion and/or the placement of objects in given image scenes or format of its composition. The invention can be used to find character strings, fields and/or zones of interest in business and government digital records.

The present invention can also be used to find structural (n) dimensional elements of documents relative to designated objects of interest to derive complex metadata relationships like bookmarks, secure zones for the application of redactions, caveats and full document and image scene structure characteristics. Other applications include rapid and accurate scene object composition and analysis for machine vision material defect identification, target identification and verification, medical imaging objects of interest for diagnosis, database registration of content objects for geographical information system (GIS) applications and biometric object detection and identification.

The present invention is directed to providing a system for pre-processing a digital image to improve overall contrast resolution, decomposing said image into n-dimensional features, mapping and recording said features, and determining the probable locations of the master image objects of interest via pattern matching. The pattern matches may be made by finding percentage probabilities from a catalog of relative geometric relationships of possible relative object configurations, which are stored via the invention's method and recordation device(s). The highest statistically matching pattern (stored as glyphs) is used to directly calculate and yield the precise location of the object or objects of interest, in each subsequent image scene.

The present invention is further directed to providing a method for determining relative position and orientation of Objects Of Interest in an image scene, comprising identifying candidate objects of interest by zonal image analysis; determining contiguous pixel organization as vectors for each candidate object of interest using symmetric rule sets; forming for each candidate object of interest an area of influence calculated from the origin of the centroid of said contiguous pixel organization; creating an axonometric projection of a first area of influence onto a second area of influence along a constrained path formed by the tangents of the first and second areas of influence; forming an overlap of the first area of influence with the second area of influence using an offset rule, the overlap comprising a glyph; incorporating into the glyph the pixel organization vectors of the object of interest in the first area of influence; calculating the coordinates of the glyph formed by the axonometric projection, wherein, the coordinates of the glyph including said vectors define a unique relationship between the first area of influence encompassing a first object of interest and the second area of influence encompassing a second object of interest.

In another preferred embodiment, the present invention is directed to providing a method for creating an axonometric projection of a third area of influence onto the second area of influence along a constrained path formed by the tangents of the third and second areas of influence; forming an overlap of the third area of influence with the second area of influence using an offset rule, the overlap comprising a second glyph, and calculating the coordinates of the second glyph formed by the axonometric projection.

The present invention is further directed to providing a method for incorporating into the second glyph the pixel organization vectors of the object of interest in the second area of influence, wherein a plurality of glyphs are recorded in a visual database according to precise orientation and residing order in the image scene, and wherein the relative position and orientation of the objects of interest in the image scene are preserved by recording glyphs in the visual database comprising a concentric recordation work space.

In another preferred embodiment, the present invention is further directed to providing a method to a. identify contiguous arrangements of pixels comprising use of pixel density to establish thresholds utilizing machine vision trained input;

b. acquire objects of interest by identifying contiguous arrangements of pixel densities from either an image file or raw data acquisition in two dimensional or multi dimensional signal wave form;

c. use a color value palette for identifying contiguous pixel density of a given image comprising an established pixel density threshold based upon the bit depth or length which corresponds to its palette or number of color variations;

d. comprise and identify direction to qualify threshold pixels by establishing the direction based on pixels which result from step b;

e. identify for noise removal (w/objection to apply noise removal techniques) all pixels that do not follow the established direction from "step d" and are not in proximity;

f. reduce false positives by comprising analysis of tangential boundaries formed by steps b-e;

g. determine tangential boundaries via step f, where by integer sets that establish resolution or granularity of the analysis identifying two components that reveal a mean frequency component from a set integer and a component of a density boundary for each set in the image scene;

h. determine discreet valuation comprising various numerical analysis methods which identify false positives and further comprising use of grid subdivision to determine contiguous pixel location;

i. use finer density to identify possible fragments in a pixel arrangement that are not contiguous, and forming each candidate object of interest from which an area of interest is calculated from the origin of the centroid of said contiguous pixel arrangement;

j. implement validation processes that produce two sets of data resulting from prior (1) Non-fragmented sets and (2) Fragmented sets for which non-fragmented sets constitutes contiguous pixel sets;

k. record significant pixel arrangement of sets comprised of (1) Non-fragmented set and (2) Fragmented sets, which are stored into a temporary memory register; and l. form a candidate of an object of interest calculated from the origin of the centroid of contiguous pixel arrangements.

In a preferred embodiment, instruction sets comprising the method of the present invention use C++ code on a common language interface (CLI) and library compatible Operating System (OS) such as modern versions of Microsoft Windows™. The instruction sets in C++ may also be compiled to execute on alternative OSs such as UNIX or Linux variations. Hardware components of the present invention comprise Best Available Technologies (BAT) motherboard and bus interface with a multi-core type central processor (CPU); (facilitates rapid instruction set execution and availability for subsequent processes).

A fast seek/write hard disk or other compatible RAM device for performing input/output (I/O) tasks is preferred to facilitate rapid instruction set execution and availability for subsequent processes. A minimum 3.25 GBs RAM and primary temporal memory execution from CPU pipe is preferred. A modern video acceleration bus board, rapid rendering of decoded images and Graphic Processing Unit (GPU) off-load of CPU and RAM instructions are preferred. In other embodiments, standard universal serial bus interface (fire wire preferred), scanner and capture device interface are preferred. In other preferred embodiments, modern scanner or image data acquisition and capture device are optional, as the present invention accepts raw or formatted raster or encapsulated postscript (EPS) input, and does not require an image acquisition device. A modern video monitor capable of rendering a compatible range of bit depth to the input image data is preferred, but optional. All standard raster and encapsulated postscript (EPS) formats and raw encoded streams and/or memory frames are accepted by the present invention.

BRIEF DESCRIPTION OF THE DRAWINGS

FIG. 16A shows identified applications of the present invention for document imaging, and 16B shows identified applications for medical imaging, and indicates the types of invention classes used by these applications.

FIG. 17A shows identified applications of the present invention for forensic and law enforcement, FIG. 17B for reconnaissance and remote sensed imaging, and FIG. 17C for legal research and litigation support. The types of invention classes used by these applications are also indicated.

FIG. 18A shows identified applications of the present invention for machine vision imaging, FIG. 18B for digital photographic imaging, FIG. 18C for digital rights management, and FIG. 18D for consumer digital cameras. The types of invention classes used by these applications are also indicated.

FIG. 19A shows identified applications of the present invention for natural resources management, FIG. 19B for environmental management imaging, and waste management imaging. The types of invention classes used by these applications are also indicated.

FIG. 20A shows identified applications of the present invention for terrestrial and celestial navigation. FIG. 20B for mapping and cartography, and FIG. 20C for transport and logistics imaging. The types of invention classes used by these applications are also indicated.

FIG. 21A shows identified applications of the present invention for gaming management, sports, and FIG. 21B for training, and fashion. The types of invention classes used by these applications are also indicated.

DETAILED DESCRIPTION OF PREFERRED EMBODIMENTS OF THE INVENTION

In brief: The present invention is a precise method to locate objects of interest in any given image scene space, which finds the presence of objects based upon pattern matching geometric relationships to a master, known set. The invention can be used to find strings of characters in document images and non character groupings for applications in OCR and manual entry tasks, machine vision material defect identification, reconnaissance target identification and refinement, medical imaging tissue and bone identification, metric collection, growth and cell differentiation and other density quantification applications.

The invention is a process and system that prepares images for feature and attribute detection and identifies the presence of potential objects of interest, then narrows down the objects based upon how well they match a pre designated master template. The process by which matching takes place is done through finding all objects, plotting its area, juxtaposing a sweet spot overlap of its area on master objects, which in turn forms a glyph shape. The glyph shape is recorded, along with all other formed glyphs in an image's scene space and then mapped to form sets using a classifier and finally a pattern matching algorithm. The resulting objects of interest matches are then refined to plot the contour boundaries of the object's grouped elements (arrangement of contiguous pixels of the given object called a Co-Glyph) and finally snapped to its component actual dimensions e.g., x, y of a character or individual living cell.

The invention provides a method to precisely calculate the actual location of coordinate boundaries of human or machine trained designated objects of interest, which is not dependent on solving for the relative distance between estimated objects of interest.

Figure 1:
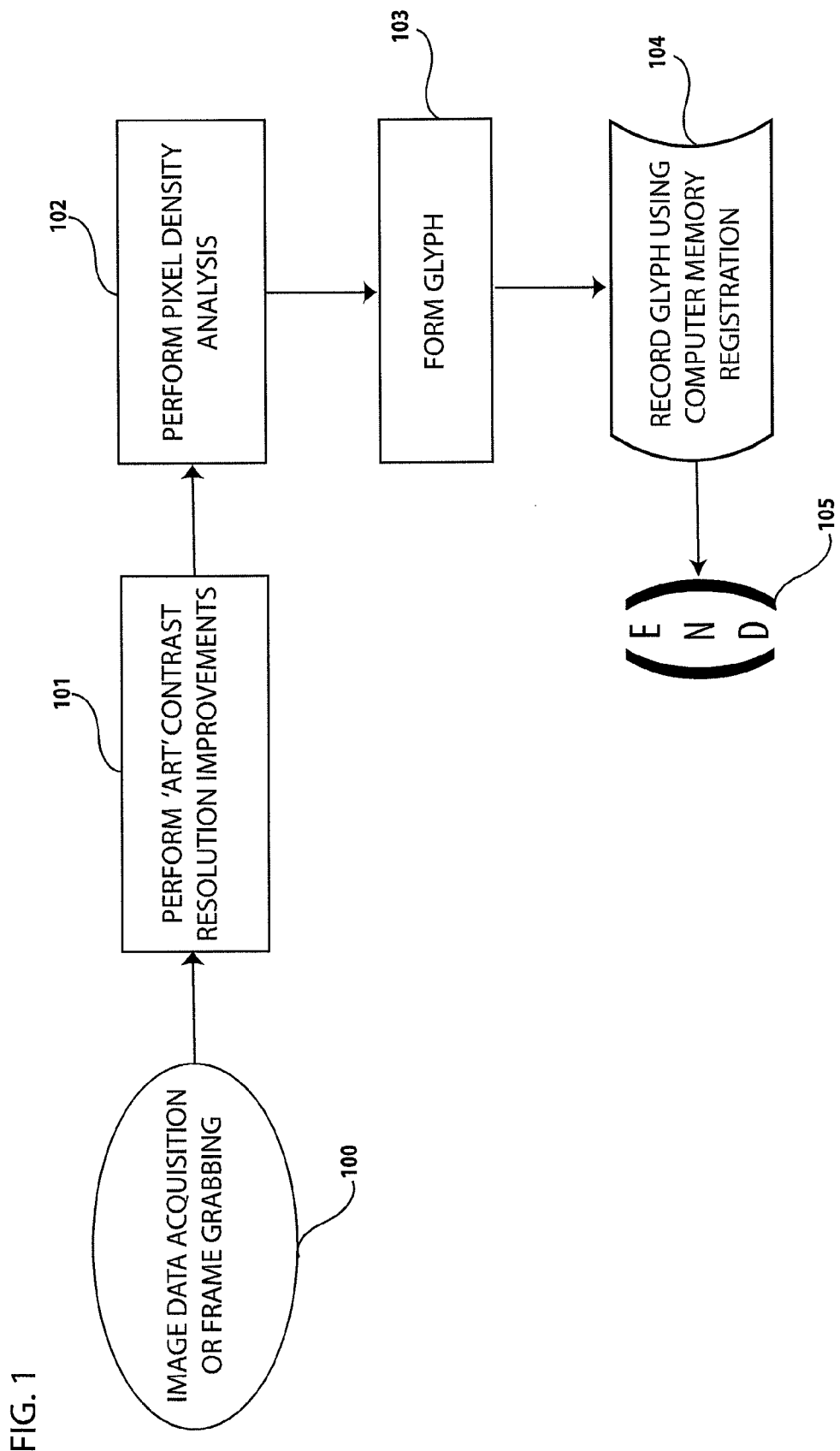
FIG. 1 depicts the high-level steps used to form Glyphs
Figure 2:
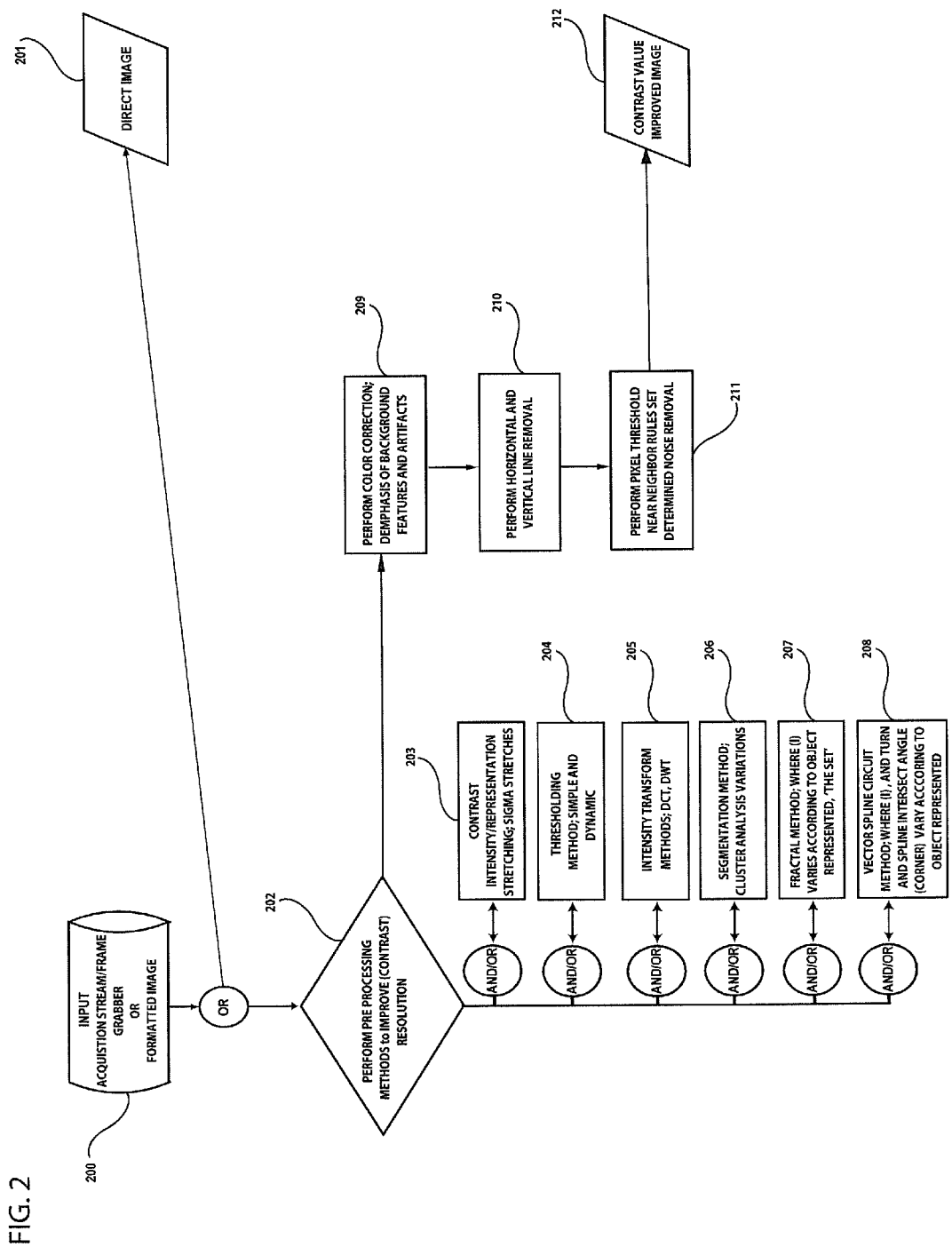
FIG. 2 depicts the process flow steps used to acquire image data, art methods to improve the acquired images' contrast resolution.
Figure 3:
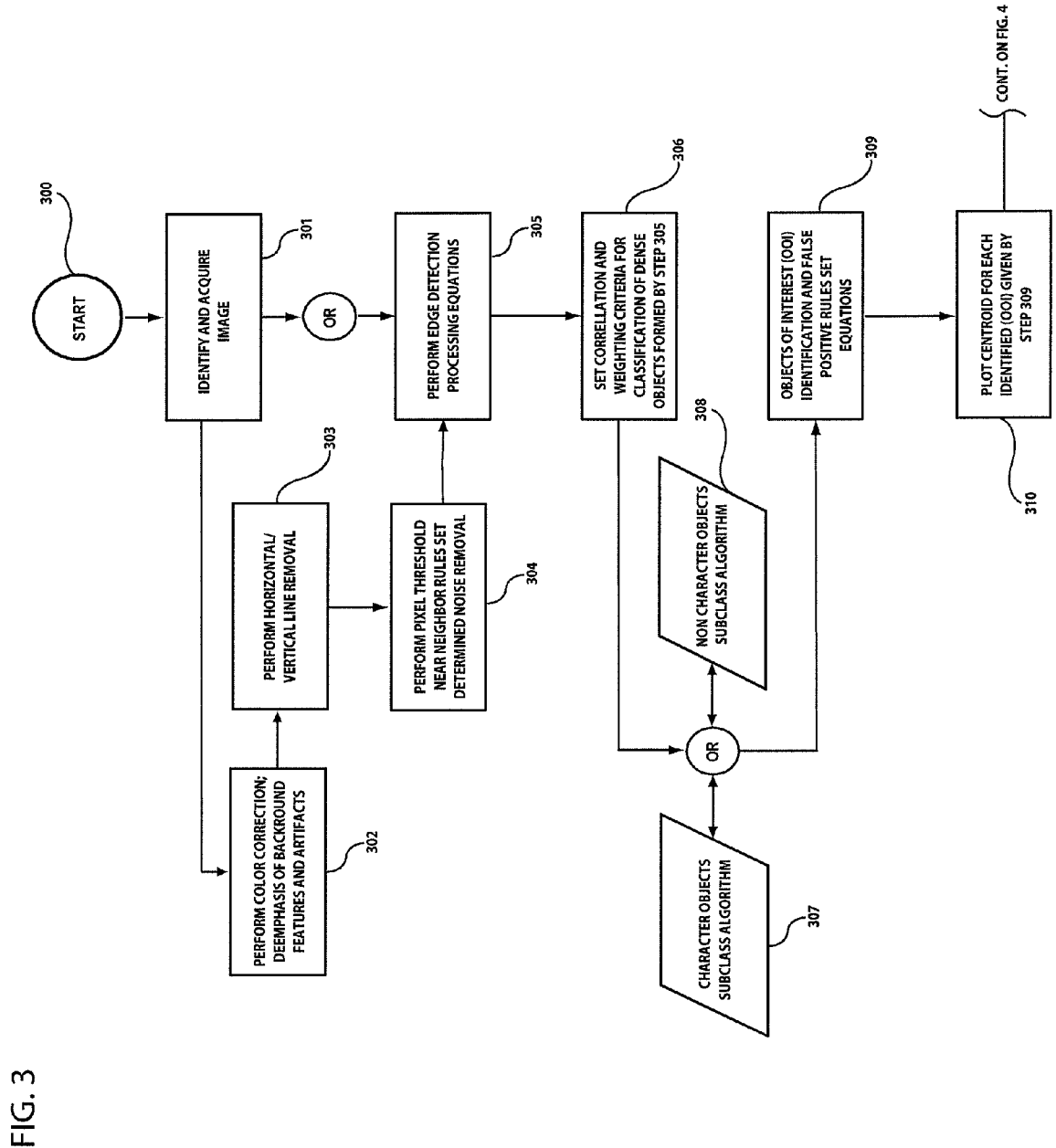
FIG. 3 depicts the process flow steps used to correct acquired image data, detect edges of features using 'Art' methods, perform pixel density analysis, and action to plot the centroid of each resulting Object of Interest (OOI).
Figure 4:
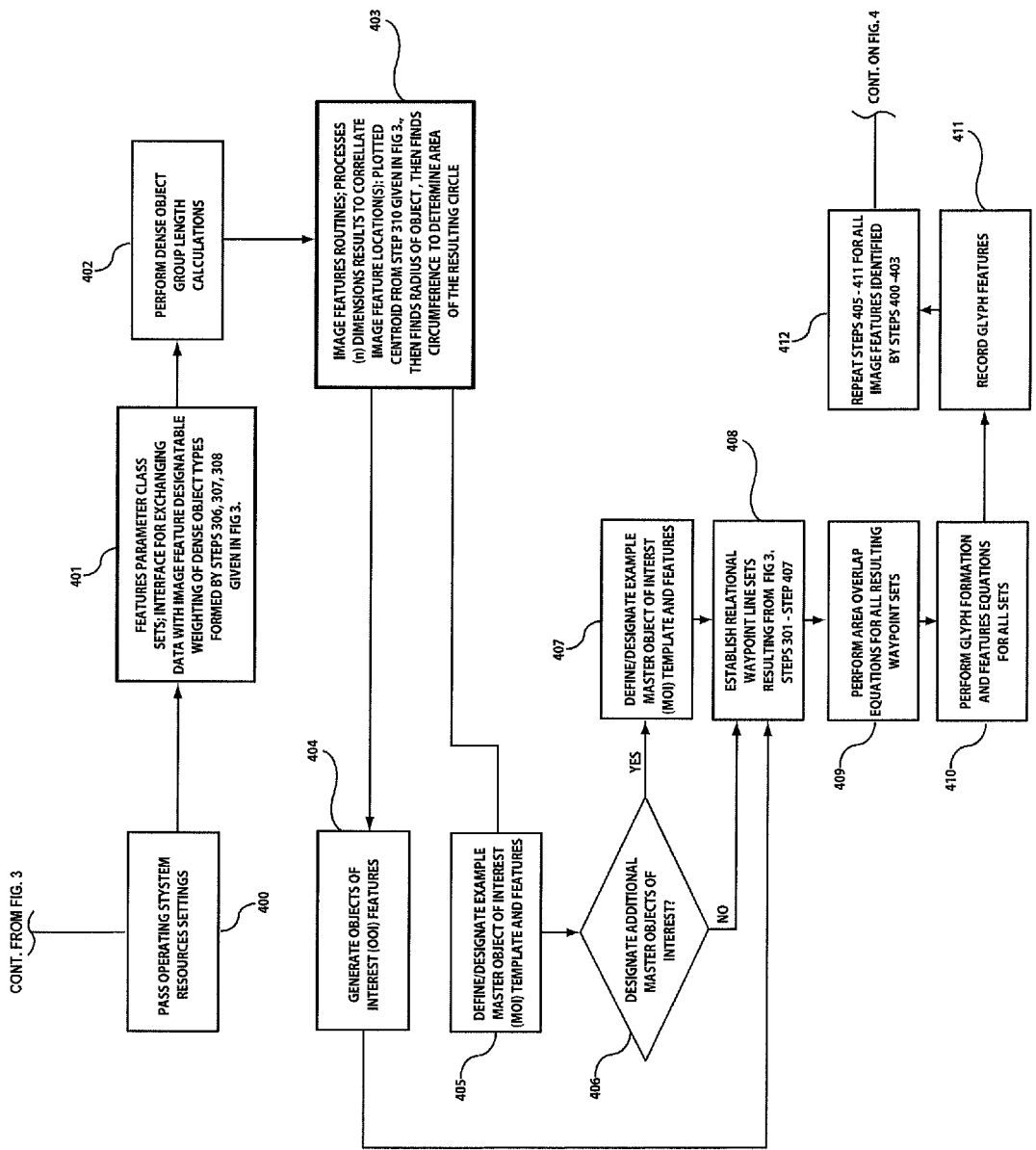
FIG. 4 depicts the process flow steps used to form objects of interest (OOI) and Master 'common' (Cm) Object of Interest (MOI) features and the analysis steps to plot, converge, & overlap each found OOI, to form glyphs to perform subsequent comparative analysis.

FIG. 1 is a simple overview from image capture to formation of the respective glyphs and their recording. FIG. 2 through FIG. 4, are a full task-based process flow start to finish. FIG. 2 depicts the image data acquisition thru contrast resolution improvement steps. FIG. 3 depicts the steps necessary to perform image identification which identifies contiguous pixel arrangements, and performs color correction as described in FIG. 12, and uses the processes described in FIG. 13 & FIG. 14 to identify and isolate non contiguous pixels as noise and to determine edge or boundary attributes (using the steps in FIG. 5) and feature identification of the contiguous arrangements and noise data sets. Then using the geometry of all of the data sets establish ordinal paths or vectors determine the criteria for character and non-character objects. Then using the steps in FIG. 15 false positives in contiguous and non-contiguous data sets are eliminated and Objects of Interest output. Then the centroid or origin is plotted for each Object of Interest in the image scene.

Figure 7:
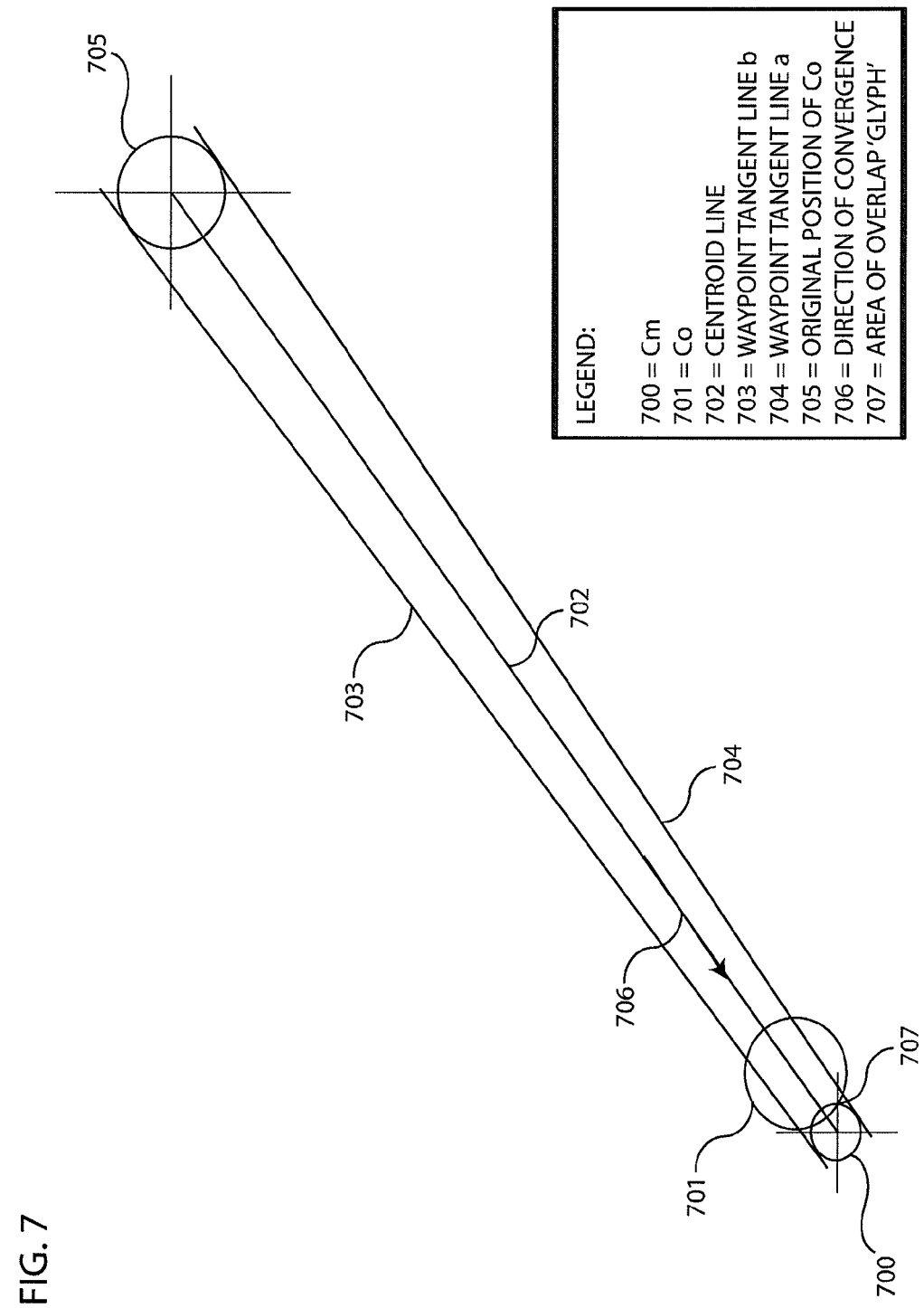
FIG. 7 depicts a two dimensional diagram of an object of interest and a master object converging (indicated respectively by the labels 'Cm' and 'Co') to form an area of overlap termed 'glyph' according the methods disclosed in an aspect of the invention.
Figure 8:
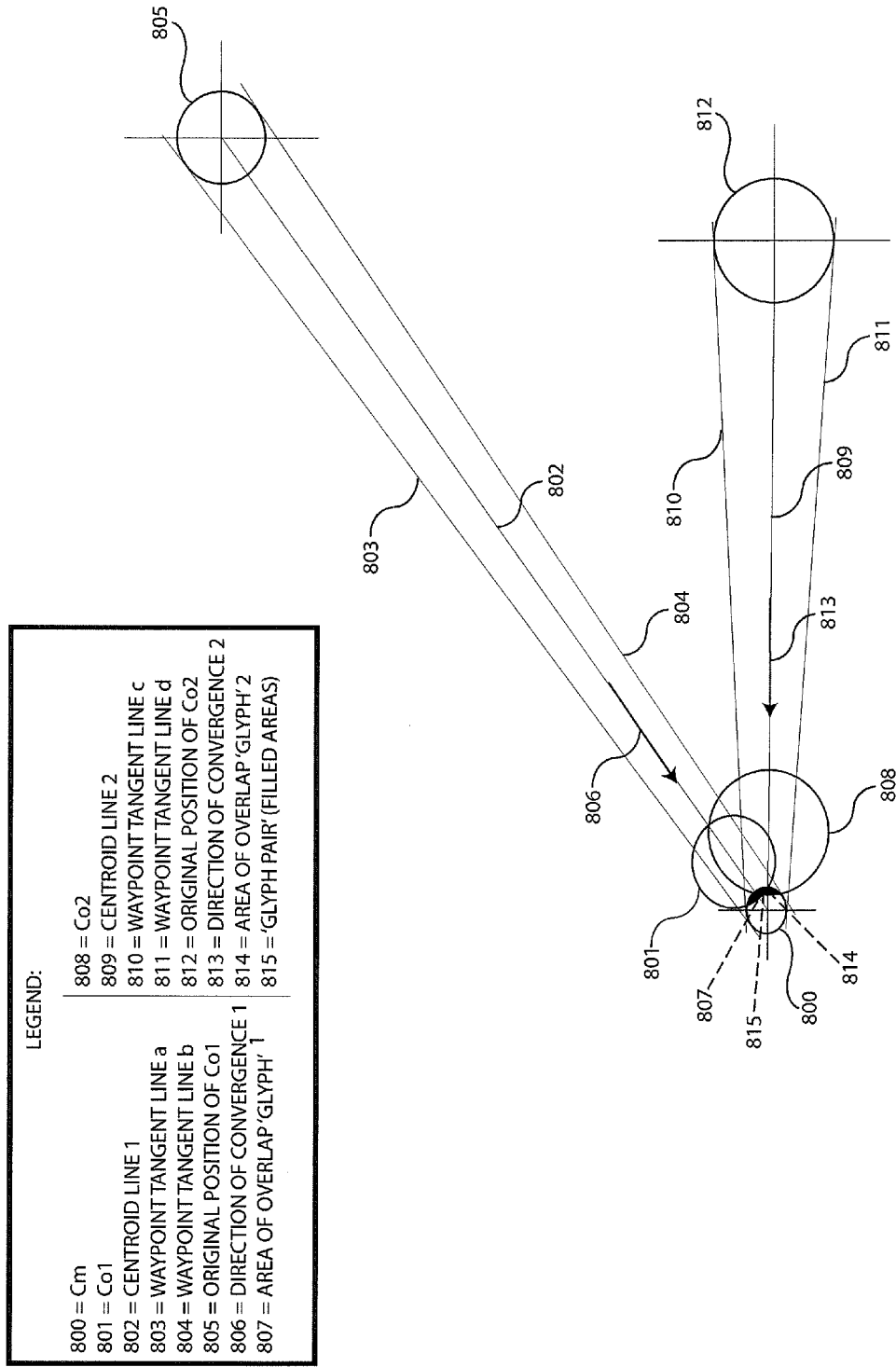
FIG. 8 depicts a two dimensional diagram of two objects of interest (indicated by '$Co_1$' and '$Co_2$') and a master object, for which the two objects of interest converge upon the master object and form a glyph pair, according to the methods disclosed in an aspect of the invention.
Figure 9:
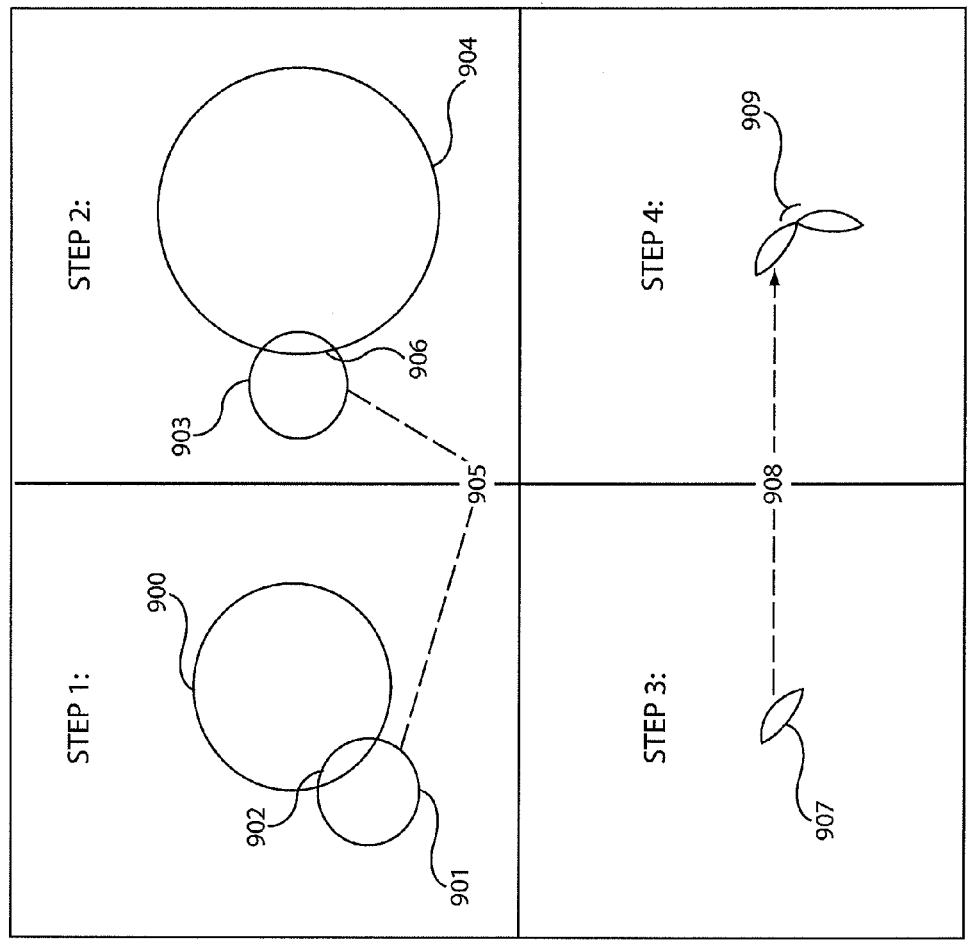
FIG. 9 is a graphical four step sequence that shows an exemplary set containing two glyphs formed by OOIs 1-3, which together form a glyph pair composed of $\{GI_1 \text{ and } GI_2\}$.
Figure 10:
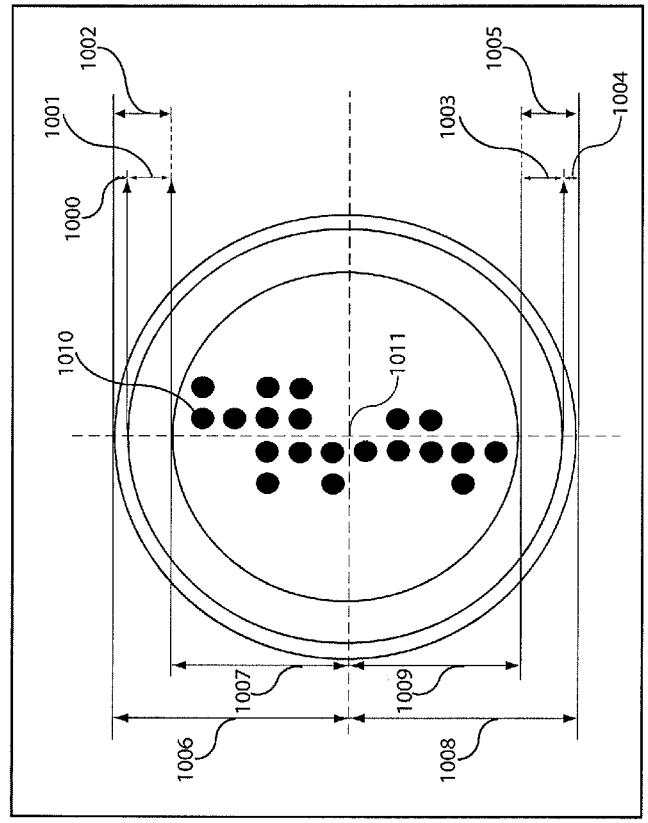
FIG. 10 depicts an algebraic method and process for calculating the area of influence (AOI) of one object of interest (OOI) upon another OOI in which the function of x defines the boundaries of the influence given as a value of proximity range and its −n dimensions, according the variable A and its coefficient n. The example given plots as x, y relative the OOI's centroid (origin). In −n dimensions, the plot is given as sets of x, y relative to −n dimension or z'.
Figure 11:
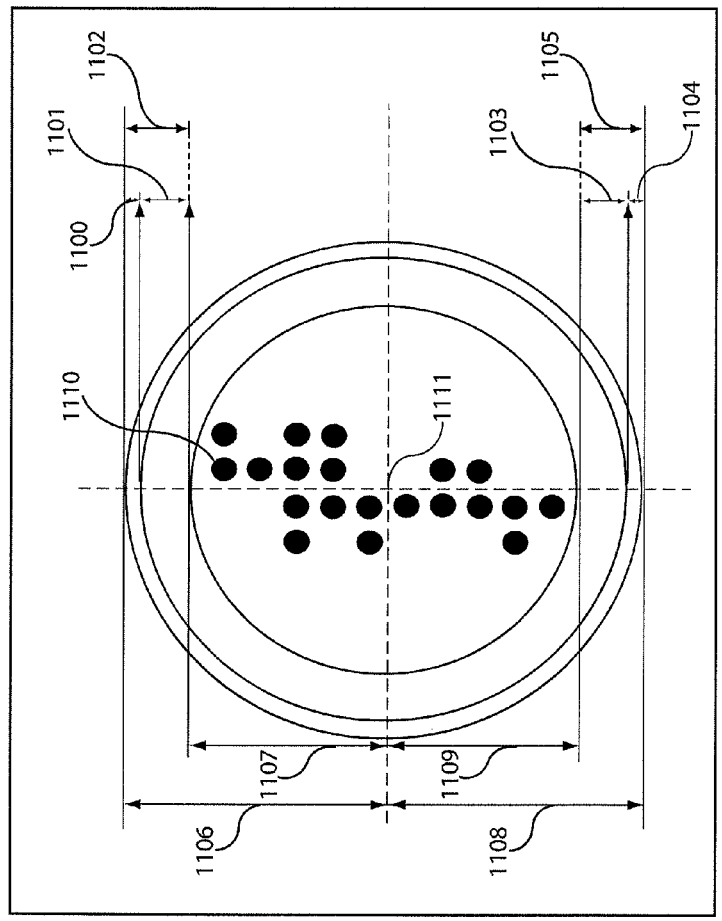
FIG. 11 depicts an algebraic method and process for calculating the area of influence of one object of interest (OOI) upon another OOI, in which the function of x defines the boundaries of the influence given as a value of proximity range in two dimensions. The example given plots as x, y relative the OOI's centroid (origin).

FIG. 4 shows the process overview step for performing the methods and steps given in FIGS. 10 & 11 to correlate image feature locations and find the radii and circumference of a resulting circle surrounding each Object of Interest and calculates the area of overlap of relational Objects of Interest for forming Glyphs. The morphology of the contiguous arrangements of pixels/Objects of Interest is output and Master Objects of Interest are identified. And the Glyph is formed using the steps in FIG. 6 to plot the way points and centroid lines to calculate the convergence of the Objects of Interest. FIG. 7 shows the process of determining the direction of convergence and performing the convergence to form the area of overlap, initial Glyph. FIG. 8 shows how a second Object of Interest is converged on the Master 'Common' Object of Interest to form a second glyph as a Glyph pair joined to the first Glyph. A simplified series of steps of the initial Glyph and the relational second Glyph and the resulting Glyph pair is shown in FIG. 9. The final step in FIG. 4 is illustrated in FIGS. 10 & 11 as the resulting verified contiguous arrangement of pixels for each Object of Interest found in the image scene and in FIG. 15 the contiguous arrangements of pixels once output from the false positive elimination steps, which once inserted into its relational Glyph are retained and recorded as a co-glyph.

FIGS. 5 through 15 show detailed methods for accomplishing aspects of the invention as they specifically relate and are referenced in the narrative process flow body of the detailed description section of the application that follows. The narrative body is intended to give the reader a logical progression of the flow of the preferred embodiments by following the full process flow in FIGS. 5 through 15, while taking care to ensure that one skilled in the art has the benefit of understanding the methods used to produce the disclosed results via logical presentation and examples.

FIGS. 16 through 21 show identified applications of the present invention. While applications of the present invention are not limited to those identified in the figures, they are illustrative. Identified applications of the present invention include document imaging and medical imaging, forensic and law enforcement, reconnaissance and remote sensed imaging, legal research and litigation support, machine vision imaging, digital photographic imaging, digital rights management, and consumer digital cameras, natural resources management, environmental management imaging, waste management imaging, terrestrial and celestial navigation, mapping and cartography, transport and logistics imaging, gaming management, sports, training, and fashion.

The types of invention classes used by these applications are also indicated. The indicated invention classes comprise the following:

Rapid Image Scene Object (–n) Dimensional Mapping & Recording
Object of Interest (OOI) Identification
Pattern Training Data Generation
Rapid Object-Class Identification OOI Pattern Identification
OOI Pattern Re-cognition
OOI Differential Data Analysis
OOI Motion Vector Recording
Temporal Resolution Calibration of Collection Arrays
App-Driven OOI Selection
Inter-Image Scene Motion Vector Tracking & Analysis
OOI Scene Position Prediction
OOI & Scene-Based Compression
OOI-Aided Machine Vision Inspection
Privacy Act/Security Friendly OOI ID & Analysis
OOI Visual Search Interface (Non Semantic).

Figure 22:
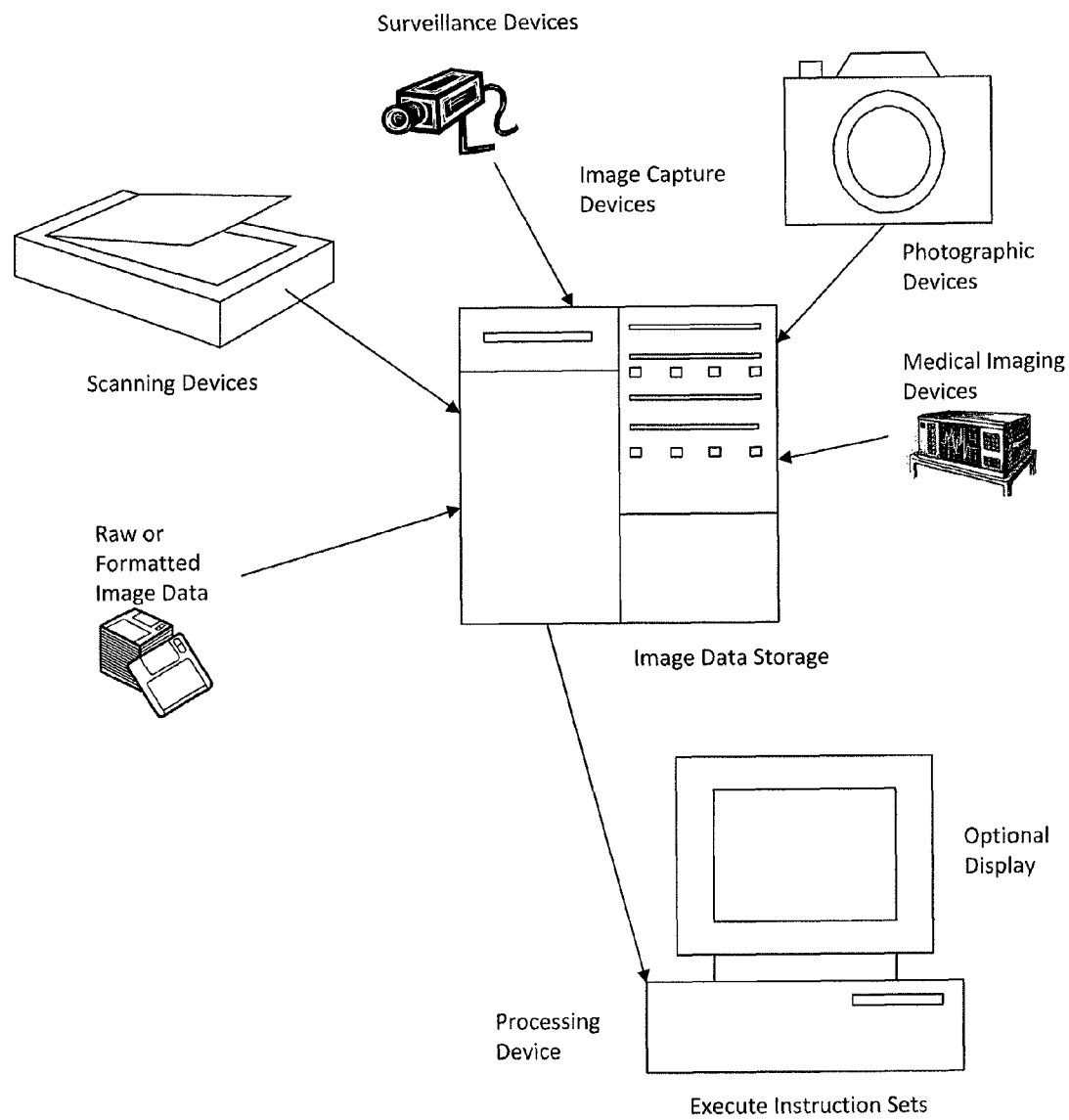
FIG. 22 shows an arrangement of components for capturing images, storing images, and executing instruction sets of the present invention.

FIG. 22 shows a basic arrangement of components for capturing images, storing images, and executing instruction sets of the present invention. This basic configuration may be adapted to any of the applications identified in FIGS. 16 through 21.

In detail: Referring now to FIG. 1, there is shown a process flow diagram which presents an overview of one preferred embodiment of the present invention, illustrating six process steps for using a computer to capture/acquire digital images, or image data [100], improve their contrast resolution, [101], analyze their pixel density composition(s) [102], perform glyph formation [103] for which the process step/algorithm is given as an aspect of the invention, and record the resulting glyph(s) [104] in a computer memory register, and end the process as shown in step [105]. Where, the process is then illustrated in further detail in FIG. 2.

Referring now to FIG. 2, there is shown a process flow diagram which presents process steps for performing aspects of the invention from the image data acquisition step [200 and 201] through the output step which produces an image that has its contrast resolution improved [212].

According to a preferred embodiment of the invention, a computer program and interface provides system controls and user interaction to perform acquisition of the image data via a 'raw' type (acquisition stream/frame grabber) or formatted image [200] or a direct unformatted image [201], which is decoded via a computer program to a memory register and made available to perform various digital image pre-processing methods to improve the input image's contrast resolution [202]. These methods given in the preferred embodiment are applied/processed using the input image from the preceding steps [200 and 201] as inclusive or conditional additive steps where, the inclusion steps are a preferred embodiment of the invention.

FIG. 2 is a process flow diagram which depicts the data input/acquisition step [200] through the contrast value improved image step [212]. Step [200] depicts that the image data is either acquired via a scanner device or capture array device such as a CCD housed in a mounting and/or transport mechanism 'system', or captured via a direct memory in-line grabber such as a frame grabber computer bus-based board. Optionally, depicted by the or gate inline from step [200] and the flow intersection of step [201], captured image data from step [200] may be passed directly if an image possesses sufficient contrast resolution characteristics/specifications, and may not require additional process steps such that steps [202-212] would otherwise provide. In a preferred embodiment, of the invention, all images captured via step [200] are passed through steps [202-212] to ensure that every image processed has the highest probability for attaining an improvement of their respective contrast resolution characteristics/specifications.

Referring now to FIG. 3, there is shown a process flow diagram which presents an overview of one preferred embodiment of the present invention illustrating a step [301] to identify and/or acquire a given image, or select it for the process flow. Next, an identified/acquired image for step [301] is passed to step [302] which performs color correction to 'adjust' the image's color table values, which are used to calculate individual pixel or ranges of pixel values. This process or correction is accomplished by identifying a color table and color model method that differs from the color method used by the acquisition and/or encoding methods. The preferred embodiment of the present invention uses a color table and method that is based on the color method written in the image's header or other metadata present in the encoded image, or in the case that the image is a raw or simple memory flow, the color method value is supplied by the header, metadata of the capture device or system, by which a lookup table (LUT) is used to cross reference the system type value to an alternative method which improves the image via the background, features and artifact de emphasis effects used in step [302].

Figure 12:
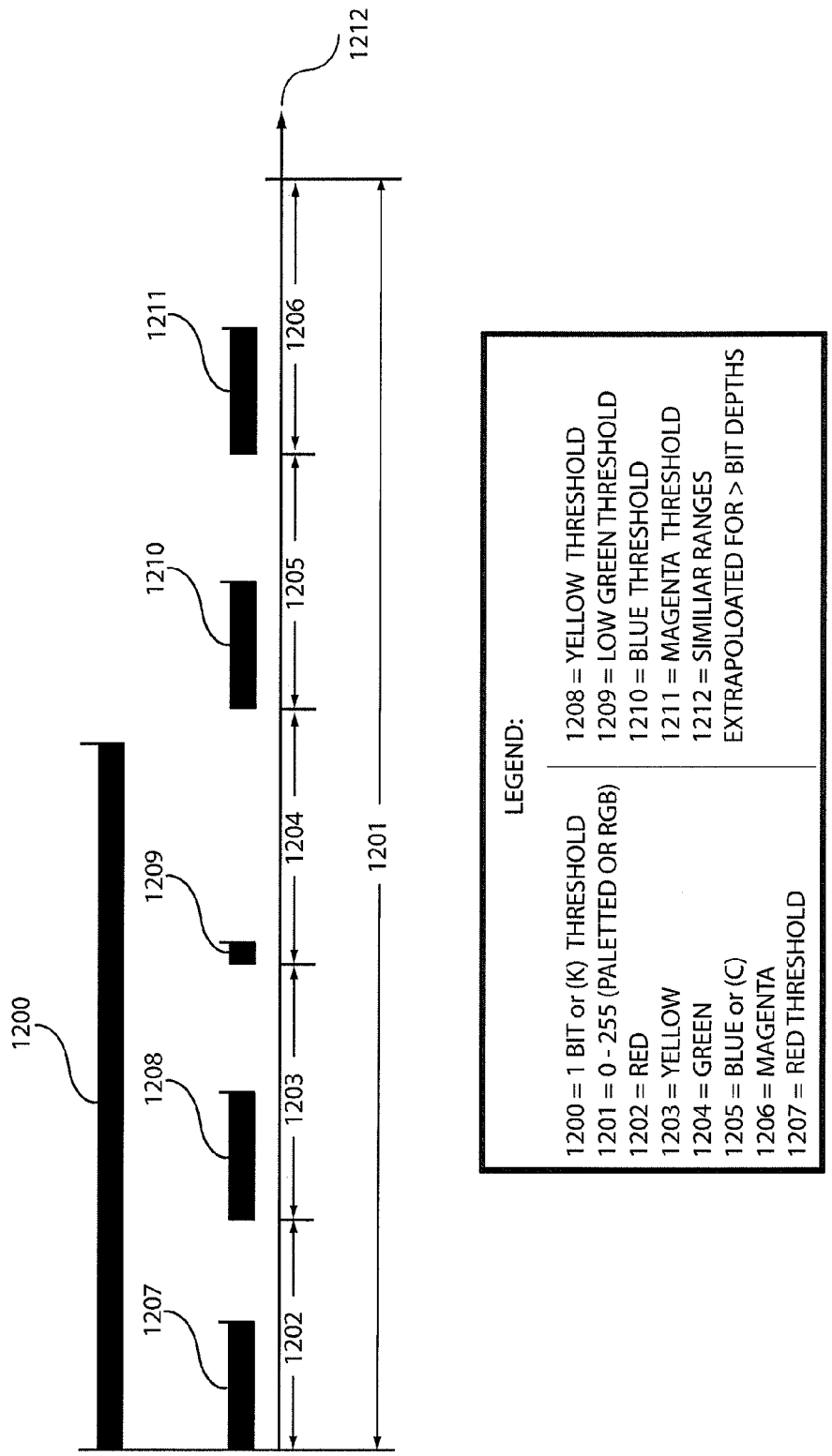
FIG. 12 shows a one bit (bitonal intensity or black) and 8 bit linear quantities of Red, Green, Blue for RGB-based images, and Blue, Magenta, Yellow for CMYK-based images, plotted against a full 8 bit (255+0) range for establishing individual pixel density thresholds as a function of a given pixel's color composition.

Color correction is performed as shown in detail in FIG. 12, steps: 1200-1212. Where, FIG. 12 shows a method for re-calculating the bit depth (referred to in the art as 'bitplanes') of an input image from FIG. 3, step 301, to improve its overall contrast resolution. Step 1201 shows the 'full' working or color 'gamut' range in 8 bit scale, which is further segmented into; (red, step 1202, yellow, step 1203, green step 1204, blue or cyan 'c' step 1205 and magenta, step 1206).

Next, the color gamut contains thresholds which limit the quantity of color representation, so as to emphasize the highest probability of the spectrum gamut's component for contributing to a given image's overall contrast resolution. The threshold quantity is indicated by the ranges of each gamut color component in relation to the full gamut color component e.g., step 1202 shows the full gamut color component of red, and step 1207 shows the lesser range of the designated threshold value of red, yellow step 1208, low green step 1209, blue step 1210, magenta step 1211. Note; it is widely accepted in the field of digital image processing science that (on average) most images concentrate their contrast resolution 'interpretation' component pixels in the green gamut component, which is generally considered by those versed in the art to be 60% or greater of the total interpretable contrast resolution of a given image. This means that the green threshold, indicated by step 1209 must be set to capture as much green pixel components as is reasonably possible to render the greatest probability of interpretive contrast resolution components. The preferred embodiment sets the green threshold artificially low, as indicated by step 1209, to ensure that the greatest quantity of green pixel gamut is retained and emphasized.

Step [303] can optionally be used to perform art methods for identifying horizontal and/or vertical contiguous pixel arrangements to perform traditional art 'line removal' functions. In the case that the invention is used for forms processing or another pattern recognition application in which removing line arrangements is desirable, line removal [303] is used.

Figure 13:
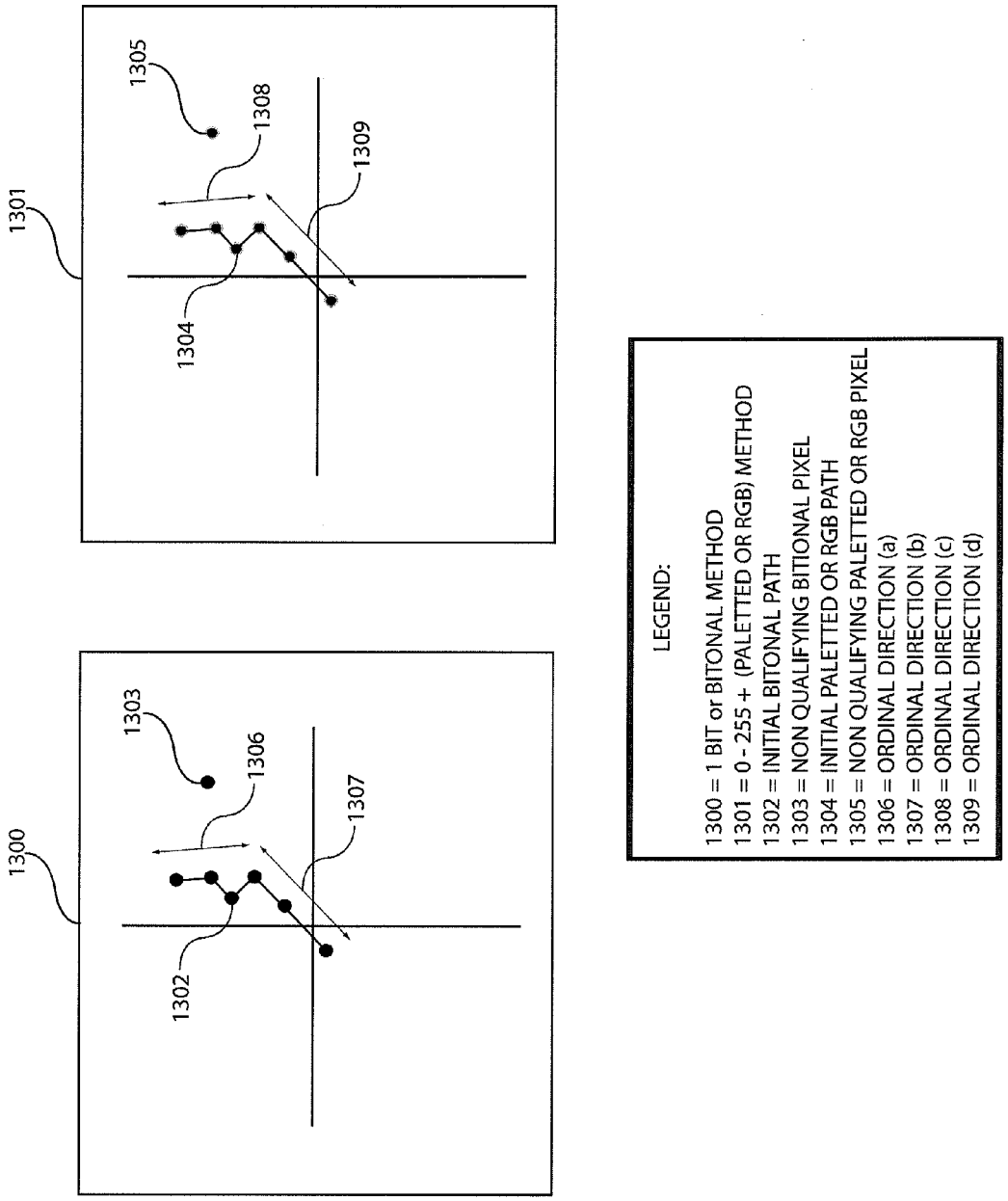
FIG. 13 shows two x, y axes; one for bitonal and one for palleted color ranges, for which an ordinal path of qualifying pixels are associated based on threshold ranges and proximity established by an aspect of the invention.
Figure 14:
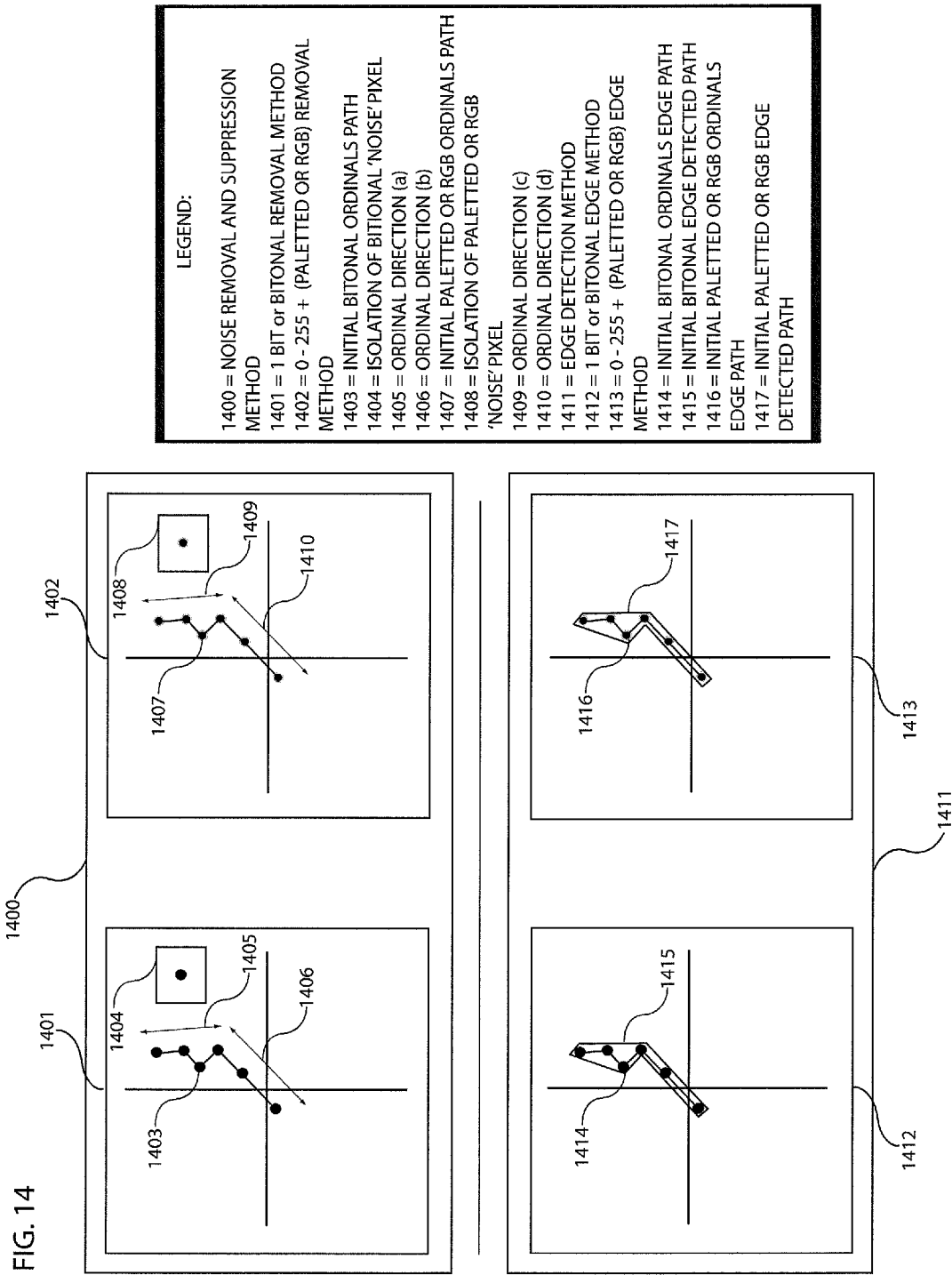
FIG. 14 shows four x, y axes; the two on top for bitonal and palleted (left and right respectively) isolation of noise pixels, not in the initial ordinal path of qualifying thresholds, established by an aspect of the invention. The two bottom left and right, for bitonal and palleted (respectively) for exemplary performance of initial edge boundaries detection, which subsequently employs 'art' methods of edge detection on the initial boundaries established by an aspect of the invention.

Once step [302] is performed, and coherent contiguous pixel arrangements in the form of 'line' formations [303] are accomplished, step [304] is performed to determine whether any pixels in the set of contiguous pixels are outside the bounds of logical consideration of the given contiguous arrangement. Those pixels identified to be outside the contiguous arrangement via step [304] are said to be 'noise' or noise pixels. FIGS. 13 and 14 provide a detailed method for performing both the ordinal directions of contiguous arrangements of pixels and logic for determining 'qualifying' and 'non qualifying' pixels, where non qualifying pixels are identified as noise.

Step [305] employs logic to perform art algorithms to determine 'edge' attributes and feature identification of the contiguous pixel arrangements and noise determination data sets output from step [302-304]. The preferred embodiment of the invention uses the most modern edge detection methods to positively qualify boundary data sets to ensure the best available technology method for establishing contours based on recognition feature weighting factors, rather than an arbitrary mathematical determination approaches.

Figure 15:
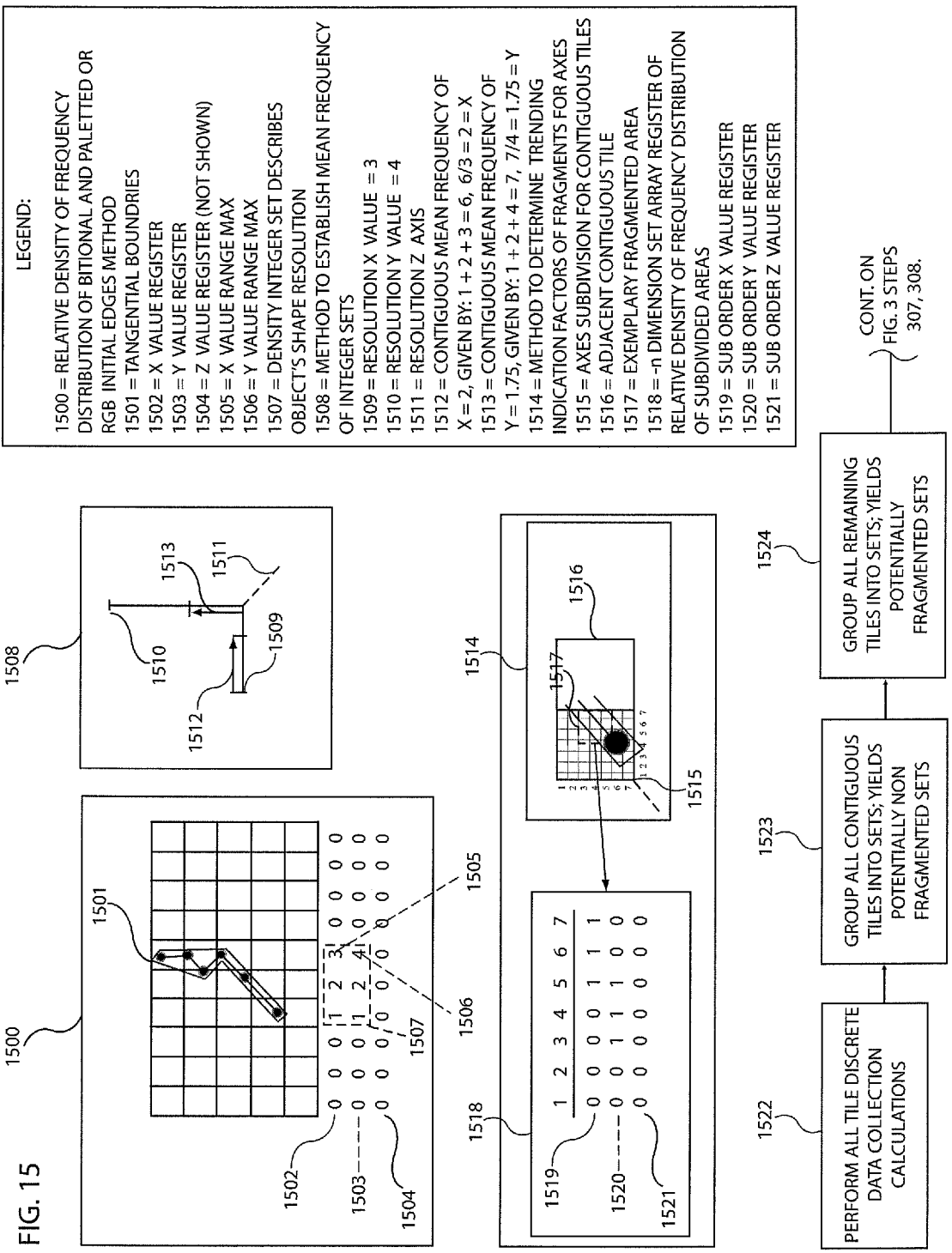
FIG. 15 shows a two dimensional plot method for identifying the relative density of the frequency distribution(s) of a given arrangement of pixels, established to be qualifying thus eliminating granular 'noise' at the scale of the given frequency distribution of the arrangement, for the purpose of reducing the incidence of false positive pixels in the eventual formation of objects of interest (OOIs). Where, the method of establishing qualified pixels and OOIs are accomplished by an aspect of the invention. The exemplary plot result, shows the 'set Integer' or '(Int)' as: (x=3), (y=4) or expressed as: the density of frequency distribution of the exemplary palletted initial edge boundaries has an Area extending, not more than (x=3), (y=4). The figure also shows an array register for identifying −n dimensions given by the z axes for each −n dimension set. The example plots two dimensions, where the z axis or third dimension is established to be 0, as shown, or flat. As a result of the exemplary Area, given as (x=3), (y=4), a mean frequency of the set Integer is shown (as x=2), (y=1.75), from which contiguous sets of pixels vs. non contiguous sets can be calculated and established by means of the algorithm as shown as "Discrete Valuation Method" steps 1514-1524.

Step [306] sets the correlation and weighting criteria logic for the process of classifying the dense object data set output from the steps through (305). FIG. 15, provides a specifically stepped disclosure and description of how the relative density of frequency distribution or initial edge determination methods are calculated to objectively qualify a given object's morphology, which is performed for the purposes of outputting a classification value in the form of relative boundary coordinates.

Following the method for determining criteria for dense objects (step 306), an 'or' gate decision is determined by whether the criteria for dense objects outputted from step 306 corresponds to a formation indicative of a character, determined by an algorithm that qualifies patterns of ordered vertices typical of character sets (step 307), or whether the criteria from step 306 shows no pattern of ordered vertices (step 308). Where, step 308 is an algorithm that qualifies whether the criteria for step 306 possesses any statistically significant characteristics of ordered vertices; thereby determining whether the value(s) constitute a character formation, or not.

Criteria from step 306, once qualified by the character (step 307) or non character (step 308) algorithms, then undergo a rigorous set of path and ordinal (directional) or vector qualifications and false positive elimination (step 309). Objects of interest (OOI) identification and qualification (step 309) consists of step 1300-1309 which illustrates a method for quantifying the ordinal direction(s) of the contiguous set of pixels outputted from step 306-308. FIG. 14 (steps 1400-1417) illustrate an algorithm for qualifying pixels which are non contiguous and designates those pixels as 'noise' (step 1404 and 1408) respectively. Where, noise pixels are determined to be non-qualifying such that step 1303 and 1305 illustrate.

In preferred embodiments, there are illustrated two distinct methods for determining contiguous arrangements of pixels vs. non qualifying pixels, which are a one bit or bitonal method, given as FIG. 13, steps: (1300, 1302, 1303, 1306, 1307), and a palleted or RGB method, given as steps: (1301, 1304, 1305, 1308, 1309).

Each of the two methods illustrated in FIG. 13, provide for: establishment of the contiguous arrangement of pixels, apart from non contiguous 'noise' pixels, and the ordinal direction, or vector path of the established contiguous arrangement.

FIG. 14 illustrates the method steps used in preferred embodiments where, a noise removal and suppression method for both bitonal and palleted RGB pixels is illustrated in steps: (1400-1402).

In greater detail, the following describes the functions of isolating non contiguous pixels and establishing ordinal directions of contiguous pixel arrangements. FIG. 14 step 1401 and 1402, show each an x, y axis upon which a contiguous arrangement of pixels are plotted, given as steps 1403 and 1407. Each x, y also shows the relative ordinal direction(s) and path(s) for both contiguous arrangements, given as step 1405 and 1406 for the bitional method, and 1409 and 1410 for the palleted or RGB method. Each axis then illustrates an isolated pixel, apart from the contiguous arrangements given as steps: 1404 and 1408.

Once steps 1400-1410 are accomplished, both the set order of contiguous arrangements, relative ordinal directions of same, and isolated pixels, which are not contiguous or 'noise' pixels are identified.

FIG. 14, step 1411 illustrates an edge detection method for a preferred embodiment, which establishes an initial set of ordinals (directions) by connecting together the centroid of each successive proximal contiguous pixel identified by performing steps: (1400-1410), where the result of the connections are a path that spans between each contiguous pixel. Steps 1412 and 1413 illustrate a similar method of performing the connections, regardless of whether the pixels are homogenous or variated, as bitonal or palleted, RGB data, such as may be required in layered (overlaid) and/or hybrid image metadata.

Step 1414 and 1416 show a geometric 2D plot method for forming a linear bounding that exactly surrounds the area of the pixel dimensions, such that a simple polygon is formed (shown as step 1415 and/or 1417), which contains the contiguous pixel arrangement identified by steps: 1400-1410. Preferred embodiments represent contiguous pixel arrangements in 3D representations as a polyhedron and a literal or abstract polytype form for generalized dimensions of 4 or more.

Once step 1415 and/or 1417 is performed the resulting polygon, polyhedron or polytype form is plotted on a relative coordinate grid corresponding to the plane or planes of the boundaries, where the proportionate scale of the coordinate grid elements are equal to the resolution of the contiguous pixel spans.

FIG. 15 step 1500 shows a plot and (2D) grid coordinates, as a method used in a preferred embodiment for identifying and quantifying the relative density of the frequency distributions of contiguous pixel arrangement for bitonal and palleted (RGB) tangential 'edge' boundaries as polygons for 2D, polyhedron for 3D or polymorphs for additional dimensions.

Steps 1502-1504 illustrate the axes displacements as registers: x (1502), y (1503), z (1504). These register displacements depict the contiguous pixel spans of the given contiguous pixel arrangement given as step 1501. Once the relative areas of the tangential boundaries or 'edge' of a given contiguous pixel arrangement are quantified by steps 1502-1504, the limits of the contiguous pixel arrangement can be calculated, as in the case of steps 1505 and 1506, for the x, y polygon shown as step 1501, and where, step 1504 (z axis) is null or not present.

The invention uses a plane and axes registration method which allows a rapid quantification, identification and description of the given arrangement of contiguous pixels for the purposes of flexibility i.e., false positive detection of non-contiguous arrangements compared to a given image scene and/or inter image scene(s) contents. The other benefit of the method is to increase the efficiency of available computing resources, so that the input from step 1508; is a method to establish mean frequency of the (integer sets) or axes registers and the follow on task of step 1514; a method to determine trending indication factors of fragments for axes. Where, the method for determining trending factors, shown as step 1514, provides a preferred embodiment with a reduced instruction set approach for identifying factors which indicate the presence of fragmented vs. non fragmented contiguous arrangement sets, which is particularly useful for performing rapid morphological pattern identification tasks.

Once the tangential 'edge' limits are identified, a preferred embodiment benefits from the further qualification and quantification of the method of establishing a mean frequency of the integer sets, given as steps 1502-1504, where the method is shown as step 1508.

Step 1508 shows the linear limits of the axes for the contiguous arrangement of pixels (step 1501) and their mean frequency, where step 1509 is the resolution of x, step 1512 is the mean frequency of x, step 1510 is the resolution of y, step 1513 is the mean frequency of y and step 1511 is the resolution of z, which is shown to be null or not present.

The mean frequency identification method, further benefits in a preferred embodiment by using a method to determine trending indication factors of fragments for the contained axes of a contiguous arrangement of pixels, given as step 1514. This method shown as 1514-1521 further refines the steps of 1500-1513 by performing a granular process of the contiguous arrangements relative to adjacent contiguous and/or proximal pixels.

Step 1515 shows a relative set of axes and coordinate grid for the scale of the resolution or pixel size (displacement) of a contiguous arrangement. It is important to note, that in the art it is a common practice to overlay varying resolutions like in applications for computer aided graphics (CAD), differing medical sensor images and Geographic Information Systems (GIS), so that performing a scaled granular or trending indicative method will effectively identify significantly fragmented and non-fragmented arrangements of objects.

Step 1516 shows an area that represents an adjacent contiguous tile of the exemplary fragmented Area, given as step 1517, for which the methods given in a preferred embodiment are used to identify and quantify its fragmented composition from steps (1514-1524).

The fragmented relative morphology of the area directly above the pixel shown in the pixel subdivision of step 1515, given as step 1517, shows a callout arrow that points to step 1518, which uses steps (1519-1521) to calculate the relative morphology of the fragmented Area indicated as step 1517.

The (−n) dimensions, or other than 2D, set array register of the relative density of frequency distributions obtained from the output of step 1508 are represented in step 1518 as: the suborder value registers (x-z) for each plane required for the (−n) dimension task calculation. Where, the 2-3D registers for each plane are shown as: suborder x value (1519), suborder y value (1520), suborder z value (1521).

As each relative scaled area, based on the resolution of the spans or separation of the contiguous pixels are identified, and calculated by the methods given as shown of: (1514, 1515, 1517-1521), the immediately surrounding adjacent contiguous tiles are successively completed identically, until the remainder of all contiguous tiles are calculated, shown as step 1522.

Step 1523; group all contiguous tiles into sets, performs a sort algorithm which identifies the contiguous non-fragmented sets from the input values supplied by (1500-1522). Where, the remaining tile sets are then identified as potentially fragmented sets, shown as step 1524. These two processes 1523 and 1524 are shown in FIG. 3, as steps 307, 308 and 309 as character, non character object subclass algorithms and object of interest identification and false positive rules set equations, shown respectively along with the conditional or gate that connects these steps.

Operating System (OS) resource settings are acquired and passed to the method shown in FIG. 15, steps: (1522-1524) in order to determine parsing optimization, given in the overview FIG. 4, as step 400.

Once the objects of interest (OOIs) are identified by the preceding steps, the center origin or centroid of each contiguous arrangement of pixels is identified and plotted, as shown in FIG. 3, step 310 (overview step) and in detail as shown in FIGS. 10 and 11, step 1011, and 1111. These steps are used by the preferred embodiment to calculate the area of influence (AOI) in (−n) dimensions as sets relative to (−n) dimensions or z', and a polygon method for 2D, as shown in FIG. 11, step 1111.

In a preferred embodiment steps 1523 and 1524, depending on the application, can be alternatively weighted via an exchange interface, so that a user may designate specific weights for certain dense objects formed, shown as FIG. 4, step 401, and subsequently the optionally weighted values are calculated in step 402 and results are passed to step 403.

Step 403 in FIG. 4 uses the methods and steps shown in FIGS. 10 and 11 to process the (−n) dimension results to correlate image feature location(s), plot centroid of OOIs to find the radius and circumference of the resulting circle of each OOI.

Once the discrete formation of the object is calculated and available via step 403, features are given in the form of the morphology of the verified contiguous arrangement of pixels, exterior bounding polygon, polyhedron or polymorph.

According to a preferred embodiment of the invention both the contiguous arrangement and exterior bounding morphology of an OOI is retained and subsequently recorded along with the glyph symbolic relationship of one OOI to another, in the form of a 'coglyph'. The resulting data set which composes the coglyph is primarily used to provide morphological descriptive data for generating granular OOI features, in addition to the gross OOI data sets given by step 404, via the details shown in FIGS. 10, 11 and 15.

In order for pattern identification enablement, a preferred embodiment specifies that an example, or 'master object of interest' (MOI) template can be created in an identical manner as OOIs through step 403, given by step 405. The master template provides an analogous data set which can be juxtaposed on processed OOIs for performing pattern recognition of found OOIs with a priori knowledge of template MOIs, to quantify and qualify their degrees of similarity.

Each image scene selected for processing is subjected to the ordered processes through step 403 to 405, where additional MOIs are designated until all exemplary MOI sets are exhausted in the image scene(s) as specified by the discrete presence gate of step 406, and subsequently defined (if present) by step 407.

If the process flow does not call for MOIs to be designated via steps 405-407, then a direct process flow generates OOIs, via steps 404 and inputs the found OOI data sets into step 408, for establishing the relative waypoint line sets. Alternatively, MOIs generated also provides input for step 408, if present and or designated.

In a preferred embodiment all OOIs are designated in a given image scene as MOIs for the purposes of subsequent availability for pattern identification and recognition against future or previously designated OOIs, so that the traditional art burden for having users manually designate template (MOI) data sets for pattern identification and recognition tasks is either eliminated and/or improved by reducing the amount of time and resources required to make the designations, and/or the probability incidence of producing a false positive result or irrelevant patterns for most applications.

Figure 6:
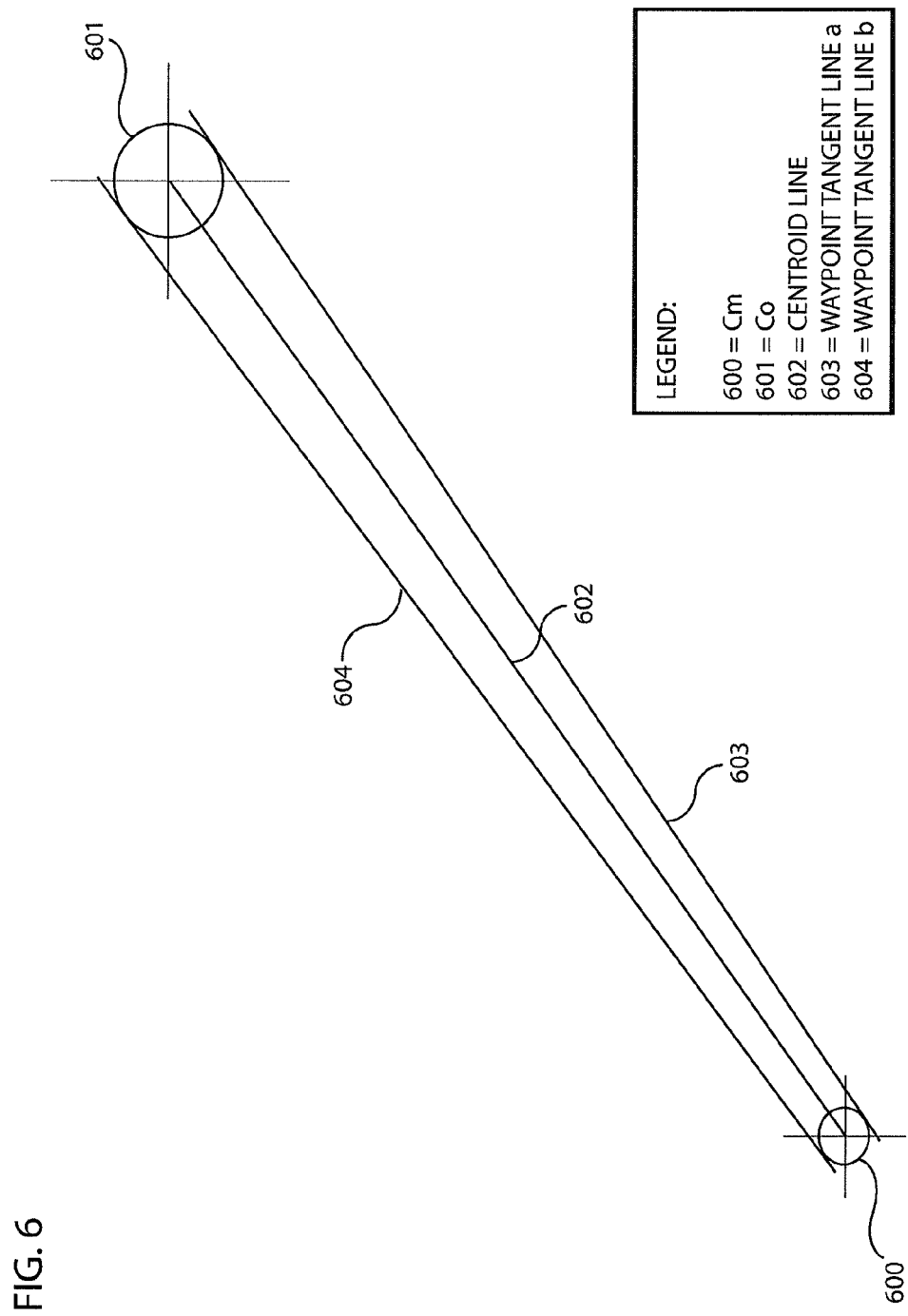
FIG. 6 depicts a two dimensional diagram of how waypoint lines are used to converge objects of interest (OOI) by projecting lines relative to the centroid of a master candidate object and the candidate object (indicated respectively by the labels 'Cm' and 'Co'). Projection waypoint lines are identified via proximity and rising rule sets, where the convergence path follows the centroid line and the intersection of the tangents of Cm and Co.

Once all OOIs and MOIs are generated and designated by steps through 404 and 407, respectively, step 408 is shows an overview step which refers to a detailed method given in FIG. 6, in which an exemplary method for forming relational waypoint line sets are established for the found OOIs and MOIs.

The definition and designation of OOIs; step 404, MOIs; step 405 and step 407 calls the methods shown in FIGS. 10 and 11, as steps; 1011 and 1111, define centroid 'origin' of OOI pixels as steps; 1010 and 1110 and calculate the radii of the origins as steps 1007/1009 and 1107/1109, previously (initially) called from step 403 in order to establish and plot tangential boundaries for step 408. Once the tangential boundaries are made available, waypoint line sets are plotted for each master candidate object of interest 'cm', and each relational candidate object indicated in FIG. 6 as step 600 (Cm) and 601(Co), so that waypoint lines extend from the first tangent point set of step 600(Cm) to the second tangent point set 601(Co) to form waypoint tangent line (a), shown as step 603. The third tangent point set of step 600(Cm) to the forth tangent point set 601(Co) to form waypoint tangent line (b), shown as step 604. A centroid line is formed between the points of the centroids of step 600(Cm) and step 601(Co) indicated as step 602.

FIG. 4, step 409 performs area overlap equations for all resulting waypoint line sets formed by step 408, using the methods in FIGS. 10 and 11. FIG. 10 is used for greater than 2D data sets and FIG. 11 for 2D data sets. Where, the area overlap is calculated using the algebraic method shown in FIG. 11, so that the function of x defines the boundaries of influence for the OOI as a value of proximity, shown as 'c' given by steps 1102 and 1105, in 2D, full steps shown as 1100-1111 as the method shown in FIG. 11 as 101 or 102.

In the case of 3D or more (−n) dimensions comprising additional plane data sets, FIG. 10 shows steps 1000-1011, indicating components of method 101 therein, processed using method steps 101-105 therein, where 'hAn', shown as method step 104-105 indicates the z' data sets for (−n) dimensional OOI data sets, resulting in the function of x definition of the boundaries of influence for the OOI as a value of proximity indicated and shown as 'c', given as steps 1002 and 1005.

In FIG. 7 is shown an OOI candidate ('Co'), indicated by step 705, which is connected to a centroid line step 702, extending from the origin of step 705 to the origin point of step 700; the MOI ('Cm'). Step 706 indicates a directional (ordinal) upon which the OOI candidate ('Co'), indicated by step 701, travels along the waypoint tangent lines 'a, b' indicated by steps 703 and 704, to form an area of overlap, indicated by step 707.

The area of overlap shown as step 707 (and as an overview step 410 in FIG. 4) comprises the 'glyph' coordinates, or glyph area. FIG. 8 illustrates the method used by the preferred embodiment which forms convergence of the two objects shown as; 805 and 800 along the direction of travel given as 806 and 813 respectively. Each object is converged to form their respective areas of overlap using the methods outlined in FIG. 4 steps 409 and 410 and the steps contained in FIGS. 10 and 11, where, the overlaps or glyph areas are indicated by steps 807 and 814.

A preferred embodiment converges the OOI on the master object and forms all area overlaps or glyph sets for a given image scene or plurality of scenes as indicated by FIG. 4 process step 410. The glyph set formed is indicated by FIG. 8 step 815 as a 'glyph pair' and shows therein as a filled or shaded area, which comprises of the method and relationships indicated by FIG. 4 process steps 408, 409 and the steps shown in FIGS. 10 and 11 to form; waypoint lines (FIG. 8 steps 802 and 809, for the convergence path, the original object positions steps 805 and 812 from the Co1 and Co2 (steps 801 and 808 respectively) upon the Cm or master object indicated as step 800.

Once the resulting glyph areas are formed the coordinates are recorded to a computer memory register for subsequent retrieval and comparative juxtaposition analysis, object identification and authentication, and pattern recognition applications. The shape of a resultant glyph area or the 'glyph' is recorded as a symbol and measurement to indicate the relationship of the master 'common' objects (Cm) and candidate objects (Co) of interest as shown in FIG. 9 as steps 902 (gI1) and 906 (gI2).

The shape of a resultant glyph area or formed glyph, shown in FIG. 9 as step 902 as 'gI1' is formed of step 900 (the first object of interest (OOI)) and the second OOI and master object indicated by 'Cm' in step 901. Next, the second glyph area indicated as step 906 as 'gI2' is formed of step 903 (the second OOI) and (the third OOI) step 904. The isolated glyph of 'gI1'; step 907 is then ready for recording, and the second glyph 'gI2; step 906 combines to form a glyph pair, indicated by step 908. Where, the glyph pair is indicated by step 909 and is ready for recording.

Each image scene and plurality of image scenes undergoes the process step 412 of FIG. 4 to repeat the designation of master objects; step 405 and OOIs through the recording of glyph features given as step 411, until all input image scene objects are exhausted.

Figure 5:
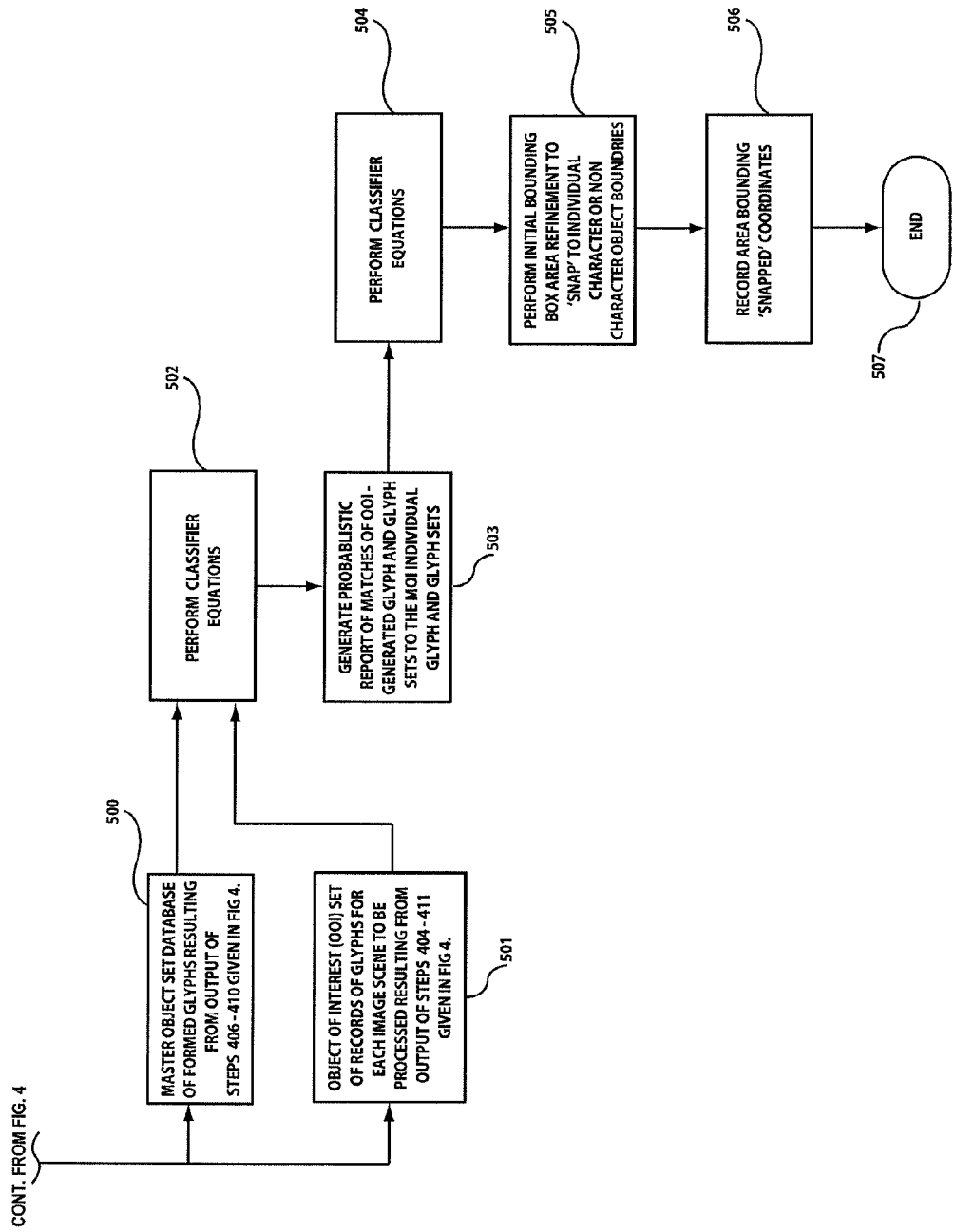
FIG. 5 depicts an example of how formed glyphs can undergo comparable analysis to perform pattern classification and isolate objects according to a defined criterion, which enables a user to compare processed image data.

A preferred embodiment then forms a master object set database of formed and recorded glyphs, indicated in FIG. 5 step 500, that result from process steps through FIG. 4. Secondly, an object of interest (OOI) set of records for glyphs formed of each image scene is created and organized in a database; step 501. Both step 500 and 501 are input to a classifier to provide object master classes based upon formed glyphs and sub classes, indicated by step 502. The resulting object classes based upon glyphs may be used to generate a probabilistic report of degrees of pattern matches of OOI-generated glyphs to the master template objects supplied by FIG. 4, step 405, given as step 503.

FIG. 5, Step 504 indicates that a secondary classifier is employed by the preferred embodiment to eliminate and/or reduce the incidence of producing false positives in the classifications that may result from step 502 and 503.

Next, the input from FIG. 5 steps 502 and 504 are made available to step 505, which performs a boundary 'tightening' process on the retained 'co-glyph' contiguous arrangement of pixels, indicated in FIG. 4 by step 404, which are 'snapped' as closely as possible to the relative scale resolution of the individual contiguous pixel arrangements. These pixel arrangements are classified as character and non character objects, as given by FIG. 3 steps 307 and 308 respectively.

Once the bounding box area refinements are formed by FIG. 5 step 505, they are recorded as their 'snapped' coordinates, indicated by step 506. The process flow is then ended as indicated by step 507.

The present invention may include all or a subset of the following components:

I: Image acquisition and identification, where images are created via any commercial means of scanning using either CCD, non CCD electro-optical devices that output a raw or formatted image bitmap in any bit depth ranging from binary (bitonal) and/or all color methods using any standard color model. Formatted or unformatted 'raw' images are output from the scanning or direct frame acquisition 'grabbing' process and inputted to a commercially-available image specifications identification process. Wherein, the commercial image specifications process quantifies the number of colors present in the image's color model, (known in the art technology as quantification or table of quantified color representation). The number of colors and ranges, once identified by the commercial method, is then used to determine which subsequent commercial pre processing methods and functions to employ; where, methods to perform pre process bitonal data differ from grayscale and color image spaces. The objective of performing preprocessing methods in the context of this invention is to prepare the image by optimizing its contrast resolution, so that pixels are given the highest degree of discretion from the continuous tone background of a given image scene.

Types of identifications that may be performed are:
(a) image size in x, y pixels or linear distance*dpi=total pixels, or pixels/dpi=linear distance.
(b) color space mapping methods: RGB, CMYK, CIE, YIQ, YPbPr (scaled YUV), xvYCC, HSV or HSB (hue, saturation, brightness), HSL ((hue saturation, luminance (intensity)) or other standard model
(c) Image format type; industry standard types
(d) Gamma level (intensity: relative input voltage)
(e) Frequency of linear density; given as x,y (2D) grids II: Perform color correction, where de emphasis of background features/artifacts—color correction is accomplished using commercially available methods to normalize the distribution of color values that are created. Normalized color is an industry-standard method to blend image features which are aesthetically objectionable, or impede image interpretation and/or have the mathematical probability of becoming further emphasized by other commercially available additive pre or post processing methods. All of these types of image features are commonly termed artifacts, where an artifact is any image feature that inhibits the faithful or desirable reproduction of an image subject.

Conduct generalized mathematical segmentation using clustering to separate continuous tone color areas from less continuous tone areas and bitonal range intensities in the image, which yields a background continuous tone layer, a foreground layer of the remaining color values and the bitonal intensities layer. The bitonal or 'mask' as it is referred to in the art practices by the ISO JPEG 2000 Part VI approach.

In cases where a collection of images contain dense variation in color tonal values, identification of said areas via commercial methods that employ objectifier format logic approaches, such as OCR engines, the dense regions detected by the format object engine can be used.

The invention prefers image input from multiple regions of interest (ROI) as segmented matter vs solid layers which are not segmented viz., the art practices allow either a plurality of layers factored by the number of dense regions returned by the format object approach.

III: Horizontal/vertical line removal is a commercially available method to identify the presence of continuous line segments, where the line is found using a method that:
(a) establishes a pixel density threshold; bitonal and palette indexed methods.
(b) establishes an ordinal/direction (path) in which the pixel density meets the criteria of step (a) above.
(c) line segments are removed to expose other image features that are:
(i) In close proximity to the identified line
(ii) Intersect with the identified line IV: Perform pixel threshold, near neighbor rules set determined noise removal, where noise removal methods use are accomplished using commercially available methods to remove pixels that are:
(a) scattered in low density formations
(b) isolated from high density groupings
(c) of a color quantity that matches a criteria of (a)-(b) and a threshold setting
(d) groupings or sets that meet the criteria of (a)-(c) are specifically identified for elimination (removal) by the method known as near-neighbor determination; a method and approach that categorizes the proximity or a pixel or set of pixels based upon a geometric relationship of contrast resolution, either mathematically determined via geometry relationship groupings; (as a function of linear distance, or a determination made through a standard perceptive modeling method).

The combining and order of application of components are employed to minimize the effects of image artifacts upon detecting dense pixel groupings in an image space.

V: Perform edge detection process equations, where edge detection methods are accomplished using commercially available approaches and methods or a multi spectral energy band, connected at the time of image acquisition, as process component. Where, edge detection is the use of mathematical templates (rule sets) that yield ordered derivatives based upon attributes of intensity and corresponding contrast features in designated intra and extra sets of pixel relationships to estimate the locations of contours.

Detecting contrast changes in an image's intensity may be used to isolate properties and attributes of an image in order to detect image features, which may then be used to extract features via the connecting correlation and weighting criteria for classification.

Where, image features are detected via:

Sound suppression, which inhibits textured edge features and preserves the contours of objects and regional boundaries. The main cause and effect is to reduce the noise (frequency) caused by the high density of edges created by textures that cause obscuration of features of interest.

The sound suppression procedure(s) are not part the Canny edge detection algorithm approach and method taught by J. F. Canny in "A computational approach to edge detection," IEEE Trans. Pattern analysis and machine intelligence 8(b), 1986, 679-698. The methods of sound suppression are used as an approach procedure within the edge detection algorithm methods used in the present invention.

The method of sound suppression is isotropic surround as taught by C. Grigorescu, N. Petkow and M. A. Westernberg in "Contour and boundary detection improved by surround suppression of texture edges," Image and Vision Computing, 22 (8) 2004, 609-622, where, the majority of edges that are formed by texture types that surround an edge of interest, so that an edge's orientation does not affect the suppression calculation. If preservation of the orientation of edges is required, then the anisotropic surround suppression method may be selected, where the effect of suppression will be seen most pronounced on edges that are parallel to the edge first processed and there will be some suppression on oblique edges and none on orthogonal edges.

Other methods may also be used:
Sobel edge detection
Multispectral band edge detection
Segmentation using;
(i) Intensity thresholding
(ii) Watershed method with morphing
(iii) Region growing VI: Set correlation and weighting criteria for classification of dense feature composition of objects, processing edge detection method equations—a system of error functions that are configurable via the user interface which is designed to avoid false positive results found in and around locations of perceived edges.

Correlation and weighting criteria may be set for the following cases:
(a) blurring via motion irregularities from the feed mechanism or static imaging plane and the digital acquisition array.

(b) types of shadowing produced from z axis objects extending on the imaging subject's surface area and/or irregular lighting conditions which result in light volume imbalances.

(c) types of highlight light sources that cause effects on either the x, y and or z axis of the surface area of an image subject due to irregular lighting conditions resulting in light volume imbalances.

The method employed for negating effects resulting from false positives call error negation functions, image identification, and frequency of linear density within a 2D graduated grid, so that each graduation grid contains multiple subdivisions. Subdivisions may be used according to spatial resolution of the image which is calculated and passed to make the subdivision integer.

Where,

Density frequency distribution across a given linear distance (=to x, y length of the image scene) is calculated and correlated to negate false positives by:

i. Density frequency (of pixel values) over linear distance (given as x, y) yields a mean (a) frequency of each contiguous set per user selected int. value for each line of each grid subdivision, and ii. Specific trending that indicates fragments of highly contrasting pixel values over the same linear distance as the value of (i), yields a trending indication factor for each line of each grid subdivision, and iii. A correlation of the mean ($\sigma$) frequency value and trending indication factor (given as a table of trained values) then yields a density frequency co-efficient for each line of each grid subdivision which negates the effects of false positive detection of edges, via;

Coefficients used to weight classifications of dense compositions of features and objects:

The resulting correlation and weighting criteria of dense feature composition objects with the yielded density frequency coefficient applied, along with:

i. The density frequency values over user set integer linear distance for each line of each grid subdivision contained in the image scene are then passed to FIG. 3 component, step (306); Criteria of object master class; dense object feature types.

VII: Criteria of object master class; dense object feature types step (306-308), given in FIG. 3; In order to determine whether a collection of pixels within a given area (designated by the calculations made in step (306); for each line of each grid subdivision)) is either:

(i) A character object or Step (307) FIG. 3

(ii) A non character object Step (308) FIG. 3

The mean ($\sigma$) frequency and trending indication factors for each grid subdivision, given the detected resolution from step (306) FIG. 3 given as:

Density frequency over 2D space (xn,yn) is expressed as the linear mean ($\sigma$), so that:

Each set linear increment for each line of each grid subdivision (set by the integer through the interface) will perform the following:

If the linear mean ($\sigma$) is greater than (n1-n2) then match the result to the density coefficient table (Dfc), and return value, or if less than (n1-n2) then match the result value to coefficient table (Dfc), and return value, Where, Returned Dfc values indicate:

(i) Probability of motion blurs (ii) Obscuration shadowing (iii) Inconsistencies in illumination created by the primary or alternate light sources during image acquisition So that the results are passed to the following algorithms:

Character objects subclass algorithm Step (307) FIG. 3; a set of procedures that use an algorithm that contains the probability derivatives for determining:

(a) Whether there are continuous lines of pixels of more, or less density (on the x axis and on the adjacent y axis' nearest neighbor pixels), if yes, then proceed to step (b) Step (308-309) FIG. 3, if not=the result indicates the presence of non character objects.

(b) An array of patterned lattices; (a partially ordered set or poset) indicative of edge geometry of ordered sets of characters, where a high degree of matches will yield verified character sets.

(a) Non character objects subclass algorithm; Step (308) FIG. 3 a set of rules that contain the frequency and trending indication factor ranges that are likely to be indicative of features and/or objects that are not machine generated or hand generated characters that uses an array of patterned lattices of a partially ordered set.

VIII: Objects of interest (OOI) identification and false positive rules set equations, given in FIG. 3, component step (309), where OOI identification is determined by the following algorithm:

101 Initialize set of contours and boundaries, and identified edges from output of component Step (401) FIG. 4,

102 Initialize sets of dense feature composition and dense object type values outputted from component Step (402) FIG. 4.

103 Initialize sets of 2D grid image space subdivisions set by user integer passed from component steps (301) FIG. 3 and (401) FIG. 4.

104 Perform linear distance calculation $\sqrt{(x_2-x_1)^2+(y_2-y_1)^2}$ as:

(a) (n) set of identified edges from step (101) FIG. 1

(b) Initialize set of identified object types from component step (307-308) FIG. 3 viz., character or non character types (c) Plot length of contiguous density segments that meet the set user integer threshold (d) Return (Xn, Yn) of identified contiguous density segments (e) Correlate object type, from step (b), to returned values from step (d) to negate false positives and return values (f) Do until all lines given by step (103) are calculated, and return.

IX. Plot centroid for each identified (OOI) given by step (310) in FIG. 3, where, a Centroid—is the mathematical or geographic center point or midpoint of a line or a polygon; ((circumcircle) extrapolated to a circle), and is described a two dimensional coordinate, given as (x, y).

Each identified contiguous density segment that is returned by component step (310) FIG. 3 is expressed as;

Line s;

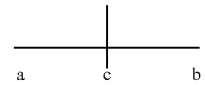

Notated as; $\overline{AB}$

Where,

Point c bisects $\overline{AB}$, so that the centroid is calculated as:

$$C = \frac{[b+(\alpha)]}{2},$$

where component step (402-403) FIG. 4 calculates to the respective n dimension coordinates of the image type that is acquired by component step (301) FIG. 3.

X. Image feature class behaviors algorithm; given in FIG. 4, component step (403), where;
  (a) Collect system resource availabilities, an interface for exchanging user a priori or a posteriori information about image features that will significantly contribute to the weighting of dense object sub types, in the following ways:
    (i) user sets the confidence percentage, which is a method for ordering segment hierarchy upon the calculated results formed by component steps (401) and (402) FIG. 4
    (ii) user sets the threshold for dense object group lengths to deduct lengths that are inconsistent with the known set of MOI parameters
  (b) Image feature routines then process the returned coordinate results to correlate the image feature locations by;
    (i) calling the centroid (C) coordinates from step IX (component step 310), given in FIG. 3
    (ii) perform formula to calculate the radius of each returned object group string of line segments returned by step (a) above
    (iii) calculate returned radius and add offset from user set width from boundary designation using the following equations;

2D Method to find the centroid of a circle and yield Cartesian coordinates for 2D images acquired by step (301) FIG. 3 calculate;

$$(x-f)^2 + (y-g)^2 = r^2$$

Where,
f and g = the points of origin and the end point of a given line or line segment respectively, and
x, y = the horizon and vertical axes respectively, and
r = radius 3D method for calculating the method to find the centroid of a circle and yield polar coordinates for 2D with 3D additive images, thus adding a 'z' axis feature or zenith, acquired by component step (301) FIG. 3 calculate;
e.g., for the radius of a circle with a centroid (C) of (x=0, y=0) and the radius=a, polar coordinates for the Area are calculated as;

$$r^2 - 2Cr\cos(\theta - \alpha) + C^2 = a^2$$

and coordinates as:

$$x(t) r\cos(t) + f$$

$$y(t) r\sin(t) + g$$

Convert polar coordinates to the Cartesian coordinates for each (n) plane dimension.

The spherical method for calculating the centroid of a circle and yield spherical coordinates for imagery acquired by FIG. 3 component step (301) in 3 or more dimensions; using the following coordinates: $(\rho, \phi, \theta)$ where,
$\rho$ = distance from origin
$\phi$ = angle from 'z' axis; (also identified as colatitudes or zenith), given as the range of 0-180°.
$\theta$ = angle from 'x' axis (polar coordinates)

Therefore, to calculate spherical coordinates to Cartesian (rectangular) coordinates the following method is used;

$$x = \rho \sin\phi \cos\theta$$

$$y = \rho \sin\phi \sin\theta$$

$$z = \rho \cos\phi$$

Find diameter and circumference from the radius yielded by one of the (n) dimension calculation methods given in step (b) (iii), above using the following calculations to convert from polar and Cartesian coordinates;
Polar from Cartesian:

$$x = r\cos\theta$$

$$y = r\sin\theta$$

Cartesian to Polar;

$$r^2 = x^2 + y^2$$

$$\theta = \arctan(x/y)$$

and, where diameter is two times the radius and the circumference, or length of the circle is found by;

$$2\pi r \text{ and,}$$

Area of the circle of the prospective OOI is found by; $\pi r^2$

XI. Generate objects of interest (OOI) features and write to database, given as component step (404), of FIG. 4. All output from component step (403), where:
  (a) dense object length segment (n) dimension coordinates,
  (b) centroid coordinates of all dense object length segments,
  (c) radius coordinates of all segment centroid coordinates,
  (d) circumference coordinates of all centroid (origin) and radius coordinates,
  (e) Area coordinates resulting circle of influence of circumference coordinates XII. Define and designate example master object of interest (MOI) template and features, and write to DB.
The master template which contains a priori or a posteriori objects of interest is termed the master objects of interest (MOIs) is given by component step (405) in FIG. 4, defined by:
  (a) master image(s) are displayed via a GUI to the operator,
  (b) objects are manually designated via operator selected centroids,
  (c) operator-designated centroids are processed into radius, circumference and area of the circle of influence, given by step (403) FIG. 4 and section XI (above),
  (d) all output from sub steps (a)-(c) (above) are written to a DB source XIII. Designate additional master objects of interest, given by component step (406), in FIG. 4.
Follow component steps (406-408), given in FIG. 4 and section XII (above).

XIV. Define and designate example MOI template and features, given by component step (407) in FIG. 4.

XV. Establish relational waypoint line sets resulting from component steps (301 FIGS. 3-407), given as component step (408) in FIG. 4.
  (a) a line segment is calculated extending from the centroid of each set of OOIs, according to rules of:
    (i) an ascension rules set, then
    (ii) proximity
  (b) by order of ascension and proximity, waypoints of the circle of influence are calculated from the arc segment of the circle of influence that intersects with the line segment that extends at an angle of 360 degrees from the centroid, and the intersection that is formed by the line segment extending at an angle of 180 degrees.
  (c) Once each set of waypoints are plotted using the method given in step (b), a line is plotted that connects the points resulting from the 360 intersection on the set of the circles of influence, in order of ascension and proximity, and a line is plotted that connects the points resulting from the 180 degree set. The resulting set of lines are the waypoints area of influence.

Waypoint and Near Field Overlap Formation FIGS. 6 and 8]; shows the centroid plots, plot of the circles of influence, points resulting from the 360 and 180 degree intersections, plot of the line that connects the corresponding points on the set of circles of influence and the resulting waypoints area of influence.

XVI. Perform glyph formation and features equations for all sets, as given by process step (410) in FIG. 4.
  (a) Established sets of circles of influence, created by the Ascension Rules Set Codex are projected based upon either a west or east rising rule, also given in the Codex that uses the east or west circle of influence set member as the origin circle of influence, termed 'origin circle'. The non origin circle is projected approaching the origin circle at the point of:
  The ratio or factor that determines the distance of centroids of the origin and non origin circles FIGS. 10 and 11]. Where, the area of influence of the resulting overlap is the glyph area or 'glyph'.

XVII. Record glyph features to DB; as given by process steps (410-411) in FIG. 4.
  (1) Glyphs are plotted on a concentric circle graduated field and a glyph set, once plotted on the field grid is termed 'one progression', in the following process order:
  Where,
  (a) The number of concentric circles in a sector work space is calculated as a ratio of the density of OOIs generated in a given image scene, given as:
  Density of OOIs:(n) concentric circles in the field grid
  (b) Glyphs are first plotted on the inner most concentric circle, (radiating from the origin of the field grid), at the corresponding sector; according to the relative orientations of the glyph in the subject image scene. When a glyph set progression can't be plotted in its correct relative orientation; glyphs are then plotted in their relative orientations on the next contiguous outer concentric circle that forms a field and sector.
  This process of relative orientation plotting is repeated until all of the glyphs from a given image scene are plotted as given by step (412) in FIG. 4. Records of glyph sets are made first from the origin or center point of the sector work space and subsequently recorded at each outward contiguous, concentric radiating circle. Thus, the sector work space is used to preserve the relative orientations of the glyph elements and resulting sets.
  (c) Logarithmic spirals are used to generate constrained variance or 'drift ranges' for the glyph sets or progressions for the purposes of pattern matching the OOIs (glyph sets or progressions) to MOIs. Constrained variance drift range values are used to represent pattern recognition training data (in the form of a motion vector).
  Each glyph set or progression undergoes the following processes:
  1. logarithmic spiral with a pitch or graduated radians of 45 degrees is overlaid between the points of the 'origin' or center point of the sector work space and the intersection of the (glyph set median; where the glyph set joins) tangent of the work space circle.
  2. Generate a mathematical reflection/reflexion map that transforms the resulting logarithmic spiral plotted from step (a) (above) into its mirror image (reflection) on the axis which is generated by a unit vector and angle of rotation.
  Where,
  (a) The axis of reflection formed by plotting a parallel plane to the line formed by the origin of the logarithmic spiral and the intersection of the point at which the glyph set joins, and the tangent of the outer ring of the concentric circle in which the glyph set is plotted.
  (b) A second axis is formed, also parallel to the first axis, given is step (a) (above) by points, where point (a)=axis, line segments (b) and (c). Line segment (c) is the midpoint axis of the reflection transform.
  (c) The logarithmic spiral is plotted at equivalent distances from the parallel plane, thus resulting in a direct reflection or mirror image of the logarithmic spiral plotted from the origin of the concentric circles of the sector work space.

Preferred embodiments of the present invention have a range of applications for document imaging and medical imaging. Referring now to FIG. 16, applications of invention classes of the present invention are identified for aspects of document imaging comprising: Document ID, Field, OOI ID & Selection, Pattern Training Data Generation, Pattern ID & Recognition, Redaction Zone ID & Selection, Metadata ID & Selection, Document Structure ID and Recording, Document Classification Generation, Document Authentication, Repository & Version Control Scene and OOI-Based Encoding, and Archival Preservation. Also in FIG. 16, applications of invention classes of the present invention are identified for aspects of medical imaging comprising: Radiography, Magnetic, Ultrasound, Microscopy, Chemical, Nuclear and Photo-Acoustic, Physical Therapy Motion Feedback Pattern ID & Analysis, and Atomic & Scanning Force Microscopy (SFM).

Preferred embodiments of the present invention have a range of applications for Forensic and Law Enforcement Imaging, Reconnaissance & Remote Sensed Imaging, and Legal Research & Litigation Support Imaging. Referring now to FIG. 17, applications of invention classes of the present invention are identified for aspects of Forensic and Law Enforcement Imaging comprising: Crime Scene Imaging, Remains Reconstruction, Document & Photographic Case Pattern Identification & Coding, Evidence Identification & Coding, Accident Investigation and Reconstruction, Debris Field Mapping and Object Recovery, Mass Vehicle and Craft ID and Mapping for Tracking, and Archeological Site Mapping, Object Recording and ID. Also in FIG. 17, applications of invention classes of the present invention are identified for aspects of Reconnaissance & Remote Sensed Imaging comprising: Photo-Optical & Electro-Optical, Multispectral, Infrared, Synthetic Aperture Radar (SAR), and Target ID. Also in FIG. 17, applications of invention classes of the present invention are identified for aspects of Legal Research & Litigation Support Imaging comprising: Intra and Inter Document Germane Pattern ID, and Discovery Triage Doc Id and Sorting.

Preferred embodiments of the present invention have a range of applications for Machine Vision Imaging, Digital Rights Management (DRM), Digital Photographic Imaging, and Consumer Owned Digital Cameras. Referring now to FIG. 18, applications of invention classes of the present invention are identified for aspects of Machine Vision Imaging comprising: Body Scanned OOI ID & Selection, Robotic Directed Guidance and Learning Input, Manufacturing & Maintenance Material Defect Detection, Structural Analysis, Material Defect ID & Grading of Organic and Inorganic Goods, Experiment Documentation and Found Objects and Pattern ID, Particle and Sub-Particle Mapping and Course Prediction, Nanogram and (n) nominal & Exponent Time Algorithms Analysis, and Parts ID & Inventory Generation. Also in FIG. 18, applications of invention classes of the present invention are identified for aspects of Digital Rights Management (DRM) comprising: IP Compliance & Enforcement, Image and Waveform Scene-Driven Variable Compression, Image and Waveform Scene-Driven Encoding, Content Registration & Authentication, Consumer-Based Content Pattern ID, and Differential ID & Analysis of Derivative Works. Also in FIG. 18, applications of invention classes of the present invention are identified for aspects of Digital Photographic Imaging, and Consumer Owned Digital Cameras comprising: Content Identification and Scene Metadata Generation for Digital Photographic Imaging, and Object Encoding, ID & Search Object Search Sharing and Matching for Networking & Commerce, and Auto-Generation of Indemnity Documentation of Assets for Consumer Owned Digital Cameras.

Preferred embodiments of the present invention have a range of applications for Natural Resources Management, Environmental Management Imaging, and Waste Management Imaging. Referring now to FIG. 19, applications of invention classes of the present invention are identified for aspects of Natural Resources Management comprising: Land Management, Forestry Resources, Minerals & Rare Earth Materials Resources, Fishery Resources, Weather (WX) Imaging for Modeling, Farming, Oceanographic Surveys, and Hydrographic Surveys. Also in FIG. 19, applications of invention classes of the present invention are identified for aspects of Environmental Management Imaging comprising: Multimedia Effluent OOI ID & Selection, Fate & Transport of Hazardous Materials, Site Imaging of Releases and Contaminations, Flow and Effluent Monitoring, and Inspection of Remediation Technologies and Systems. Also in FIG. 19, applications of invention classes of the present invention are identified for aspects of Waste Management Imaging comprising Item ID & 'Picking' Criteria Generation.

Preferred embodiments of the present invention have a range of applications for Terrestrial and Celestial Navigation, Mapping & Cartography, and Transport & Logistics Imaging. Referring now to FIG. 20, applications of invention classes of the present invention are identified for aspects of Terrestrial and Celestial Navigation comprising: Rapid Ephemeris Data Calculations and Mass Recording, Intra and Inter Scene Course Prediction, Mapping & Image Registration to Navigation Instrument Measurands, and Rapid Celestial, Terrestrial and Inner Space Mapping. Also in FIG. 20, applications of invention classes of the present invention are identified for aspects of Mapping & Cartography comprising: Terrain Identification and Coding, Map and Overlay Registration, and Archeological Search Pattern Generation & Site Investigation. Also in FIG. 20, applications of invention classes of the present invention are identified for aspects of Transport & Logistics Imaging comprising: Suspicious Package ID, Official Seals and Stamps Identification, Automatic Manifest ID & Generation, Container Inspection, and Container, Baggage and Package Recording & ID for Threat Analysis, Vehicle ID and Mapping for Infrastructure Planning, and Mass Body Scan Object ID & Recording.

Preferred embodiments of the present invention have a range of applications for Gaming Management, Sports, Training, and Fashion. Referring now to FIG. 21, applications of invention classes of the present invention are identified for aspects of Gaming Management comprising: Game Scene Analysis & Mass Recording, Fraud Pattern Detection, Asset Theft and Shrinkage Analysis, and Body Language ID, Pattern Recording & Analysis. Also in FIG. 21, applications of invention classes of the present invention are identified for aspects of Sports, Training, and Fashion comprising: Form & Performance Training Data, and Player Placement ID and Prediction for Sports; Product Part ID, Assembly & Maintenance Procedure Recoding, and Task and Process Flow Procedures Recoding and Analysis for Training; and Pattern ID for Consumer Research for Fashion.

Referring now to FIG. 22, the range of applications identified for the present invention in FIGS. 16 through 21 can be implemented in preferred embodiments with a device having various combinations of functional components as indicated. The basic arrangement of components for capturing images, storing images, and executing instruction sets of the present invention may be adapted and configured for the specific purposes any of the identified applications.

In a preferred embodiment, a camera mechanism and method may be incorporated comprising photon collection with electron well color detection charged coupled device (CCD) or similar energy detection array device for the purposes of producing digital imagery. Further comprising:

Light source; external and/or unaided via direct collection array exposure duration which provides photons made to refract from the image source's surface.

Storage; on board raw collection stream and/or frame and buffered data capture via collection array data acquisition and on-board or off board via external post processing computer storage and compilation.

Lens system; single or reflex mirror adjusted image oriented with either manual focus adjustment or an auto focus method via a focus mechanism.

Focus mechanism; manual and/or automatic exposure and motorized focus methods to include approaches to stabilization and/or temporal resolution correction.

Power source; on board cells or off board power adaptor.

In another preferred embodiment, an Image collection device (non camera configurations) may be incorporated consisting of a system to acquire electromagnetic energy or other primary energy measurements via a non electro optical device as sensor data stored as telemetry and/or raw image data.

Raw image data can be accepted by the present invention, the data consisting of acquired photon collection data converted to electron color detection such as via a well-effect and well shifting in a charged coupled device (CCD), and or similar energy collection and spectrum detection devices that use alternative materials. The detected energy telemetry may be stored as either temporal or permanent memory on or off board the camera or direct image data collection device. Further, the stored data from the energy collection device may be arranged in a streamed, block or wave form encoded fashion for the purposes of subsequent encoding to a proprietary vendor or open raw format and follow-on encoding to a standard or proposed 'working' format.

In preferred embodiments, sources of raw image data may include, but is not limited to sensor arrays and storage contained in, or in tandem to:

digital camera devices;
transported or hand-held collection arrays (scanners);
radiology imaging devices;
tomography imaging devices;
radar and synthetic aperture (SAR) imaging devices;
multispectral sensor devices used for imaging;
infrared, background radiation capture, ultraviolet, optical emission spectroscopy or which emit other forms of electromagnetic radiation;
computer bus-based or self-contained analog and digital frame grabber and buffering devices;
direct image data acquisition from analog photographic projection methods to generate stored output from detected sensor data e.g., computer output to microfilm (COM) devices.

Referring now to FIG. 22, in a preferred embodiment, instruction sets of the present invention use C++ code on a common language interface (CLI) and library compatible Operating System (OS) such as modern versions of Microsoft Windows™. The instruction sets in C++ may also be compiled to execute on alternative OSs such as UNIX or Linux variations. Instructions sets may execute on either general purpose computers or special purpose processors integrated into systems intended for any of the range of applications described in FIGS. 16 through 21.

Hardware components of the present invention comprise Best Available Technologies (BAT) motherboard and bus interface with a multi-core type central processor (CPU); (facilitates rapid instruction set execution and availability for subsequent processes). A fast seek/write hard disk or other compatible RAM device for performing input/output (I/O) tasks is preferred to facilitate rapid instruction set execution and availability for subsequent processes. A minimum 3.25 GBs RAM and primary temporal memory execution from CPU pipe is preferred. A modern video acceleration bus board, rapid rendering of decoded images and Graphic Processing Unit (GPU) off-load of CPU and RAM instructions are preferred.

In other embodiments, standard universal serial bus interface (fire wire preferred), scanner and capture device interface are preferred. In other preferred embodiments, modern scanner or image data acquisition and capture device are optional, as the present invention accepts raw or formatted raster or encapsulated postscript (EPS) input, and does not require an image acquisition device to operate as intended. A modern video monitor capable of rendering a compatible range of bit depth to the input image data is preferred, but optional. All standard raster and encapsulated postscript (EPS) formats and raw encoded streams and/or memory frames are accepted by the present invention.

While the invention has been described with reference to exemplary embodiments, it is understood that the words that have been used are words of description and illustration, rather than words of limitation. Changes may be made, within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods and uses, such as are within the scope of the appended claims.

We claim:

1. A method for determining relative position and orientation of Objects Of Interest in an image scene using an image processor, comprising:
   identifying candidate objects of interest by zonal image analysis;
   determining contiguous pixel organization as vectors for each candidate object of interest using symmetric rule sets;
   forming for each candidate object of interest an area of influence calculated from the origin of the centroid of said contiguous pixel organization;
   creating an axonometric projection of a first area of influence onto a second area of influence along a constrained path formed by the tangents of the first and second areas of influence;
   forming an overlap of the first area of influence with the second area of influence using an offset rule, the overlap comprising a glyph;
   incorporating into the glyph the pixel organization vectors of the object of interest in the first area of influence;
   calculating the coordinates of the glyph formed by the axonometric projection,
   wherein, the coordinates of the glyph including said vectors define a unique relationship between the first area of influence encompassing a first object of interest and the second area of influence encompassing a second object of interest.

2. The method of claim 1, creating an axonometric projection of a third area of influence onto the second area of influence along a constrained path formed by the tangents of the third and second areas of influence.

3. The method of claim 2, forming an overlap of the third area of influence with the second area of influence using an offset rule, the overlap comprising a second glyph, and calculating the coordinates of the second glyph formed by the axonometric projection.

4. The method of claim 3, incorporating into the second glyph the pixel organization vectors of the object of interest in the second areas of influence.

5. The method of claim 4, wherein a plurality of glyphs are recorded in a visual database according to precise orientation and residing order in the image scene.

6. The method of claim 5, wherein the relative position and orientation of the objects of interest in the image scene are preserved by recording glyphs in the visual database comprising a concentric recordation work space.

7. A device for determining relative position and orientation of Objects Of Interest in an image scene, comprising:
   an image capture component for acquiring at least one image;
   a storage component for storing at least one acquired image;
   a computational component for executing instruction sets;
   an instruction set for identifying candidate objects of interest by zonal image analysis;
   an instruction set for determining contiguous pixel organization as vectors for each candidate object of interest using symmetric rule sets;
   an instruction set for forming for each candidate object of interest an area of influence calculated from the origin of the centroid of said contiguous pixel organization;
   an instruction set for creating an axonometric projection of a first area of influence onto a second area of influence along a constrained path formed by the tangents of the first and second areas of influence;
   an instruction set for forming an overlap of the first area of influence with the second area of influence using an offset rule, the overlap comprising a glyph;
   an instruction set for incorporating into the glyph the pixel organization vectors of the object of interest in the first area of influence;
   an instruction set for calculating the coordinates of the glyph formed by the axonometric projection,
   wherein, the coordinates of the glyph including said vectors define a unique relationship between the first area of influence encompassing a first object of interest and the second area of influence encompassing a second object of interest.

8. The device of claim 7, further comprising an instruction set for creating an axonometric projection of a third area of influence onto the second area of influence along a constrained path formed by the tangents of the third and second areas of influence.

9. The device of claim 8, further comprising an instruction set forming an overlap of the third area of influence with the second area of influence using an offset rule, the overlap comprising a second glyph, and calculating the coordinates of the second glyph formed by the axonometric projection.

10. The device of claim 9, further comprising an instruction set further comprising means incorporating into the second glyph the pixel organization vectors of the object of interest in the second areas of influence.

11. The device of claim 10, wherein a plurality of glyphs are recorded in a visual database according to precise orientation and residing order in the image scene.

12. The device of claim 11, wherein the relative position and orientation of the objects of interest in the image scene are preserved by recording glyphs in the visual database comprising a concentric recordation work space.

13. A system for determining relative position and orientation Objects Of Interest in an image scene, comprising:
- a module for identifying candidate objects of interest by zonal image analysis;
- a module for determining contiguous pixel organization as vectors for each candidate object of interest using symmetric rule sets;
- a module for forming for each candidate object of interest an area of influence calculated from the origin of the centroid of said contiguous pixel organization;
- a module for creating an axonometric projection of a first area of influence onto a second area of influence along a constrained path formed by the tangents of the first and second areas of influence;
- a module for forming an overlap of the first area of influence with the second area of influence using an offset rule, the overlap comprising a glyph;
- a module for incorporating into the glyph the pixel organization vectors of the object of interest in the first area of influence;
- a module for calculating the coordinates of the glyph formed by the axonometric projection,
- wherein, the coordinates of the glyph including said vectors define a unique relationship between the first area of influence encompassing a first object of interest and the second area of influence encompassing a second object of interest.

14. The system of claim 13, further comprising a module for creating an axonometric projection of a third area of influence onto the second area of influence along a constrained path formed by the tangents of the third and second areas of influence.

15. The system of claim 14, further comprising a module forming an overlap of the third area of influence with the second area of influence using an offset rule, the overlap comprising a second glyph, and calculating the coordinates of the second glyph formed by the axonometric projection.

16. The system of claim 15, further comprising a module comprising means incorporating into the second glyph the pixel organization vectors of the object of interest in the second areas of influence.

17. The system of claim 16, wherein a plurality of glyphs are recorded in a visual database according to precise orientation and residing order in the image scene.

18. The system of claim 17, wherein the relative position and orientation of the objects of interest in the image scene are preserved by recording glyphs in the visual database comprising a concentric recordation work space.

19. A processor-readable non-transitory storage medium, storing processor-readable instructions which cause a device to perform operations, comprising:
- identifying candidate objects of interest by zonal image analysis;
- determining contiguous pixel organization as vectors for each candidate object of interest using symmetric rule sets;
- forming for each candidate object of interest an area of influence calculated from the origin of the centroid of said contiguous pixel organization;
- creating an axonometric projection of a first area of influence onto a second area of influence along a constrained path formed by the tangents of the first and second areas of influence;
- forming an overlap of the first area of influence with the second area of influence using an offset rule, the overlap comprising a glyph;
- incorporating into the glyph the pixel organization vectors of the object of interest in the first area of influence;
- calculating the coordinates of the glyph formed by the axonometric projection;
- recording at least one glyph in a visual database according to precise orientation and residing order in the image scene,
- wherein, the coordinates of the glyph including said vectors define a unique relationship between the first area of influence encompassing a first object of interest and the second area of influence encompassing a second object of interest.

20. A device using an instruction set stored in non-transitory processor readable memory to perform operations, comprising:
- identifying candidate objects of interest by zonal image analysis;
- determining contiguous pixel organization as vectors for each candidate object of interest using symmetric rule sets;
- forming for each candidate object of interest an area of influence calculated from the origin of the centroid of said contiguous pixel organization;
- creating an axonometric projection of a first area of influence onto a second area of influence along a constrained path formed by the tangents of the first and second areas of influence;
- forming an overlap of the first area of influence with the second area of influence using an offset rule, the overlap comprising a glyph;
- incorporating into the glyph the pixel organization vectors of the object of interest in the first area of influence;
- calculating the coordinates of the glyph formed by the axonometric projection;
- creating an axonometric projection of a third area of influence onto the second area of influence along a constrained path formed by the tangents of the third and second areas of influence;
- forming an overlap of the third area of influence with the second area of influence using an offset rule, the overlap comprising a second glyph, and calculating the coordinates of the second glyph formed by the axonometric projection;
- incorporating into the second glyph the pixel organization vectors of the object of interest in the second areas of influence;
- recording a plurality of glyphs in a visual database according to precise orientation and residing order in the image scene; and
- preserving the relative position and orientation of the objects of interest in the image scene by recording glyphs in the visual database comprising a concentric recordation,
- wherein the glyph coordinates including said vectors define a unique relationship between the first area of influence encompassing a first object of interest and the second area of influence encompassing a second object of interest.

* * * * *